US010706535B2

(12) United States Patent
Arar et al.

(10) Patent No.: US 10,706,535 B2
(45) Date of Patent: Jul. 7, 2020

(54) TISSUE STAINING QUALITY DETERMINATION

(71) Applicant: International Business Machines Corporation, Armonk, NY (US)

(72) Inventors: Nuri Murat Arar, Lausanne (CH); Maria Gabrani, Thalwil (CH); Govind Kaigala, Rueschlikon (CH); Aditya Kashyap, Zurich (CH); Anna Fomitcheva Khartchenko, Zurich (CH); Pushpak Pati, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 15/699,204

(22) Filed: Sep. 8, 2017

(65) Prior Publication Data
US 2019/0080450 A1 Mar. 14, 2019

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/0014* (2013.01); *G06K 9/00147* (2013.01);
(Continued)

(58) Field of Classification Search
None
See application file for complete search history.

(56) References Cited

U.S. PATENT DOCUMENTS 9,002,077 B2 4/2015 Hoyt et al.
2010/0111396 A1* 5/2010 Boucheron .......... G06K 9/0014
382/133

(Continued)

FOREIGN PATENT DOCUMENTS

AU 2015/221546 A1 9/2015
CN 103020585 A 4/2013
(Continued)

OTHER PUBLICATIONS

P. Yang and G. Yang: "Feature extraction using dual-tree complex wavelet transform and gray level co-occurrence matrix" Neurocomputing, vol. 197, pp. 212-220, 2016 which is incorporated herein by reference in its entirety.
(Continued)

*Primary Examiner* — Wei Wen Yang
(74) *Attorney, Agent, or Firm* — Harrington & Smith

(57) ABSTRACT

The invention relates to the automated determination of the staining quality of an IHC stained biological sample. A plurality of features is extracted from a digital IHC stained tissue image. The features are input into a first classifier configured to identify the extended tissue type of the depicted tissue as a function of the extracted features. An extended tissue type is a tissue type with a defined expression level of the tumor marker. In addition, the extracted features are input into a second classifier configured to identify a contrast level of the depicted tissue as a function of at least some second ones of the extracted features. The contrast level indicates the intensity contrast of pixels of the stained tissue. Then, a staining quality score of the image is computed as a function of the identified extended tissue type and the identified contrast level.

24 Claims, 13 Drawing Sheets

(51) Int. Cl.
*G06K 9/03* (2006.01)
*G06T 7/194* (2017.01)
*G06K 9/46* (2006.01)
*G06K 9/62* (2006.01)
*G01N 1/30* (2006.01)

(52) U.S. Cl.
CPC ............ *G06K 9/036* (2013.01); *G06K 9/4647* (2013.01); *G06K 9/6256* (2013.01); *G06T 7/194* (2017.01); *G01N 1/30* (2013.01); *G06K 9/6298* (2013.01); *G06T 2200/24* (2013.01); *G06T 2207/20076* (2013.01); *G06T 2207/20081* (2013.01); *G06T 2207/30024* (2013.01); *G06T 2207/30096* (2013.01); *G06T 2207/30168* (2013.01); *G06T 2207/30204* (2013.01)

(56) References Cited

U.S. PATENT DOCUMENTS

| | | | |
|---|---|---|---|
| 2011/0170754 A1 | 7/2011 | Yoshihara et al. | |
| 2013/0114874 A1* | 5/2013 | Kask | G06K 9/0014 382/133 |
| 2014/0349382 A1* | 11/2014 | Thomson | C12Q 1/02 435/288.5 |
| 2015/0005190 A1* | 1/2015 | Ciftlik | B01L 3/5027 506/9 |
| 2016/0042511 A1* | 2/2016 | Chukka | G06T 7/0012 382/133 |
| 2016/0321495 A1* | 11/2016 | Chukka | G06T 7/0012 |
| 2018/0121709 A1* | 5/2018 | Garsha | G06K 9/38 |
| 2018/0182099 A1* | 6/2018 | Lesniak | G06T 5/002 |
| 2018/0232883 A1* | 8/2018 | Sethi | G06T 7/0014 |

FOREIGN PATENT DOCUMENTS

| | | | |
|---|---|---|---|
| WO | 2009/020972 A2 | 2/2009 | |
| WO | 2015/135550 A1 | 9/2015 | |
| WO | 2016146469 A1 | 9/2016 | |

OTHER PUBLICATIONS

N. Kingsbusy. "The dual-tree complex wavelet transform: A new technique for shift-invariance and directional filters." Proceeding of the IEEE Digital Signal Processing Workshop, pp. 120131, 1998 which is incorporated herewith by reference in its entirety.

M. Jian, H. Guo and L. Liu. "Texture Image Classification Using Visual Perceptual Texture Features and Gabor Wavelet Features." Journal of Computers, vol. 4(8), Aug. 2009.

H. Shan, X. Chao, G. WeiQiao, T. Yong and L. Yan. "Texture feature extraction based on wavelet transform and gray-level co-occurrence matrices applied to osteosarcoma diagnosis." Journal of Bio-Medical Materials and Engineering, vol. 24, pp. 129143, 2014.

S. Livens, P. Scheunders, G.V. de Wouwer, D.V. Dyck, H. Smet, J. Winkelman and W. Bogaert. "A Texture Analysis Approach to Corrosion Image Classication." Journal of Microscopy, Microanalysis, Microstructures, vol. 7(2), pp. 1-10, 1996.

J. Han and K.K. Ma. "Rotation-invariant and scale-invariant Gabor features for texture image retrieval." Journal of Image and Vision Computing, vol. 25, pp. 14741481, 2007 which is incorporated herewith by reference in its entirety.

X.. Lopez, E. D'Andrea, P. Barbot, A.S. Bridoux, S. Sandrine, I. Salmon, O. Debeir and C. Decaestecker. "An automated blur detection method for histological whole slide imaging." PLoS One, vol. 8(12), Dec. 2013.

8. R.M. Haralick, K. Shanmugam and I. Dinstein: "Texural features for image classification", IEEE transaction on systems, man and cybernatics, vol. 3(6), pp. 610-621, Nov. 1973.

D. G. Lowe, "Distinctive Image Features from Scale-Invariant Keypoints", International Journal of Computer Vision, vol. 60, No. 2, pp. 91-110, 2004.

R.D. Lovchik, G.V. Kaigala, M. Georgiadis and E. Delamarche. "Micro-immunohistochemistry using a microfiuidic probe." Lab Chip, vol. 12(6), pp. 1040-1043, Mar. 2012.

Peng Shi, et al.., "Automated Ki-67 Quantification of Immunohistochemical Staining Image of Human Nasopharyngeal Carcinoma Xenografts", Scientific Reports, Aug. 2016, 9 pgs.

* cited by examiner

|  | Healthy | Primary Tumor Her2(-) | Primary Tumor Her2(+) | Metastasis Her2(-) | Metastasis Her2(+) |
|---|---|---|---|---|---|
| Healthy | 40 | 3 | 2 | 1 | 1 |
| Primary Tumor Her2(-) | 1 | 30 | 5 | 14 | 0 |
| Primary Tumor Her2(+) | 2 | 5 | 47 | 1 | 5 |
| Metastasis Her2(-) | 0 | 7 | 1 | 48 | 1 |
| Metastasis Her2(+) | 3 | 3 | 8 | 4 | 21 |

Overall accuracy: 73.5%

TISSUE STAINING QUALITY DETERMINATION

BACKGROUND

In recent years, tissue profiling using IHC has assumed an increasingly important role in cancer diagnosis and treatment. Immunohistochemical staining is widely used in the identification of abnormal cells such as those found in cancerous tumors. In fact, using such staining, pathologists not only provide diagnosis but also prognostic and therapeutic prediction about the patient's tumor. IHC analysis has assumed a critical role in clarifying the diagnosis in challenging cases and resolving differential diagnoses. Moreover, IHC testing of different markers can provide information useful for planning targeted therapies in the clinical setting.

In histopathology, IHC-stained tissue sections of patient biopsies are evaluated by pathologists in order to study the presence and grade of a disease. Conventionally, pathologists examine cells and tissues under a microscope to search for the disease presence using many years of training and experience. Diagnosing a disease after manually analyzing numerous biopsy slides can be tedious and represents a labor-intensive work for pathologists. Besides, the diagnosis is affected by subjective judgment and intra- and inter-observer variability. In this respect, digital pathology aims to extract quantitative information from scanned histopathological sections to aid pathologists in the diagnostic process. Recent advances in digital pathology enables the automated recognition of relevant patterns and has the potential to provide valuable assistance to the pathologist. Researchers in the fields of pathology and image analytics have recognized the importance of quantitative analysis of pathology images. This quantitative analysis of digital pathology is important not only from a diagnostic perspective, but also to understand the underlying rationale for a specific diagnosis being rendered. Hence, it can play an important role to support pathologists' decision about the presence/absence of a biomarker being indicative of a particular disease, and also to help in stratifying disease progression.

In order to achieve accurate results in IHC staining, the selection of optimal staining parameters is key. A selection of the wrong staining parameters such as staining duration or stain concentration can result in understained tissues and false negative observations and/or in overstained tissues and false positive observations. However, the identification of the appropriate staining parameters for a particular tissue is a time consuming, tedious task. Moreover, even in case the lab practitioner intends to stain a particular tissue according to a well established staining protocol, all kinds of errors may arise before and during the staining process. Thus, a method of assessing the staining quality based on the analysis of a digital image of the stained tissue would be highly advantageous as it would allow to avoid erroneous medical diagnosis and treatment decisions resulting from a wrong manual or automated interpretation of tissue images whose staining quality is low.

Existing methods for tissue staining quality assessment aim to evaluate the quality of staining tissue sections do not allow to identify the contribution of individual staining parameters to the final staining quality (see e.g. M. Grunkin and J. D. Hansen. 2015. "Assessment of staining quality. International Patent" WO 2015/135550 A1, and Pinard, R., Tedeschi G. R., Williams C., and Wang, Donaxiao 2009: "Methods and system for validating sample images for quantitative immunoassays", WO 2009/020972 A2). Pinard et al. presented a system for qualitative evaluation of digital images. The system extracts at least one quantitative quality indicator and compares it against respective user-defined or pre-defined minimum acceptable thresholds. The quantitative quality indicators include signal intensity and uniformity based staining quality assessment, sample sufficiency and position based tissue integrity and image focus based image integrity. Failure of one or more of the quantitative quality indicators to meet its respective threshold suggests that the sample is unsuitable for subsequent automated pathological evaluation. The method suggested by M. Grunkin et al. is based on a comparison between the staining at the working laboratory with standardized staining achieved at a standardized laboratory, and determining a quantitative quality measure describing a quantitative relation between both staining. Therefore, the method requires a reference staining produced at a standardized laboratory in order to assign a quality value to a control staining. Their measure of quality is based on features like connectivity, number of cells, number of positive and negative nuclei, Allred-score, and the like.

SUMMARY

In one aspect, the invention relates to an image analysis method for automatically determining the staining quality of an IHC stained biological sample. The method comprises:
  receiving a digital image of an IHC stained tissue sample of a patient, the pixel intensities of the image correlating with the amount of a tumor-marker-specific stain;
  extracting a plurality of features from the received digital image;
  inputting the extracted features into a first classifier, the first classifier being configured to identify the extended tissue type of the tissue depicted in the digital image as a function of at least some first ones of the extracted features, the extended tissue type being a tissue type with a defined expression level of the tumor marker;
  inputting the extracted features into a second classifier, the second classifier being configured to identify a contrast level of the tissue depicted in the digital image as a function of at least some second ones of the extracted features, the contrast level indicating the intensity contrast of pixels of the stained tissue;
  computing a staining quality score for the tissue depicted in the digital image as a function of the identified extended tissue type and the identified contrast level.

In a further aspect, the invention relates to an image analysis method for automatically determining, for one or more staining protocol parameters of an IHC staining protocol, a respective parameter value range that will result in a staining of a tissue sample with a tumor-marker specific stain that fulfills predefined staining quality requirements. The method comprises:
  receiving a plurality of images of one or more IHC stained tissue samples belonging to multiple different extended tissue types, the pixel intensities of each image correlating with the amount of a tumor-marker-specific stain, the depicted tissue samples having been stained with the same tumor-marker-specific stain but with different values of each of the one or more staining protocol parameters;
  extracting a plurality of features from each of the received digital images;
  automatically analyzing the extracted features for identifying an extended tissue type and a contrast level of each of the tissue samples, the extended tissue type being a tissue type with a defined expression level of the tumor marker;

for the tissue depicted in each of the received images, computing a staining quality score as a function of the identified extended tissue type and the identified contrast level of the tissue;

performing, for each of the one or more staining protocol parameters:

for each of the extended tissue types:

identifying all images depicting a tissue of said extended tissue type for which a quality score that exceeds a quality threshold was computed;

identifying the minimum and maximum staining parameter value (of the currently evaluated parameter) used in the staining protocols that were applied for staining the tissues depicted in said identified images;

returning a staining parameter value range for the staining protocol parameter, the range being delimited by the identified minimum and maximum values.

According to embodiments, the extended tissue type is selected from a group comprising:

PT+ tissue, the PT+ tissue being tissue comprising or consisting of primary tumor tissue that expresses the tumor-marker;

PT− tissue, the PT− tissue being tissue comprising or consisting of primary tumor tissue that does not expresses the tumor-marker;

MT+ tissue, the MT+ tissue being tissue comprising or consisting of metastatic tumor tissue that expresses the tumor-marker;

MT− tissue, the MT− tissue being tissue comprising or consisting of metastatic tumor tissue that does not expresses the tumor-marker;

HT tissue, the HT tissue being healthy tissue located in spatial proximity of the primary tumor or of a metastasis.

In a further aspect, the invention relates to a computer program comprising computer-interpretable instructions which, when executed by a processor, cause the processor to perform a method according to any one of the embodiments of a method for determining staining quality or of a method for determining suitable staining parameter ranges described herein. For example, the computer program can be embodied in a volatile or non-volatile storage medium, e.g. in an electromagnetical or optical storage medium or a cloud storage.

In a further aspect, the invention relates to an image analysis system comprising:

a storage medium comprising a first classifier and a second classifier;

an interface configured for receiving a digital image of an IHC stained tissue, the pixel intensities of the image correlating with the amount of a tumor-marker-specific stain;

a processor configured for:

extracting a plurality of features from the received digital image;

inputting the extracted features into a first classifier, the first classifier being configured to identify the extended tissue type of the tissue depicted in the digital image as a function of at least some first ones of the extracted features, the extended tissue type being a tissue type with a defined expression level of the tumor marker;

inputting the extracted features into a second classifier, the second classifier being configured to identify a contrast level of the tissue depicted in the digital image as a function of at least some second ones of the extracted features, the contrast level label indicating the intensity contrast of pixels of the stained tissue;

computing a staining quality score for the tissue depicted in the digital image as a function of the identified extended tissue type and the identified contrast level.

In a further aspect, the invention relates to an image analysis system comprising:

a storage medium comprising a first classifier and a second classifier;

an interface configured for receiving a plurality of images of one or more IHC stained tissue samples belonging to multiple different extended tissue types [of the same or different patients], the pixel intensities of each image correlating with the amount of a tumor-marker-specific stain, the depicted tissue samples having been stained with the same tumor-marker-specific stain but with different values of each of the one or more staining protocol parameters;

a processor configured for:

extracting a plurality of features from each of the received digital images;

automatically analyzing the extracted features for identifying an extended tissue type and a contrast level of each of the tissue samples, the extended tissue type being a tissue type with a defined expression level of the tumor marker;

for the tissue depicted in each of the received images, computing a staining quality score as a function of the identified extended tissue type and the identified contrast level of the tissue;

performing, for each of the one or more staining protocol parameters:

for each of the extended tissue types:

identifying all images depicting a tissue of said extended tissue type for which a quality score that exceeds a quality threshold was computed;

identifying the minimum and maximum staining parameter value used in the staining protocols that were applied for staining the tissues depicted in said identified images;

returning a staining parameter value range for the staining protocol parameter, the range being delimited by the identified minimum and maximum values, the range being a staining parameter range adapted to stain a biological sample with a tumor-marker specific stain such that predefined staining quality requirements are fulfilled.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure.

In the following embodiments of the invention are explained in greater detail, by way of example only, making reference to the drawings in which.

DETAILED DESCRIPTION

Figure 1A:
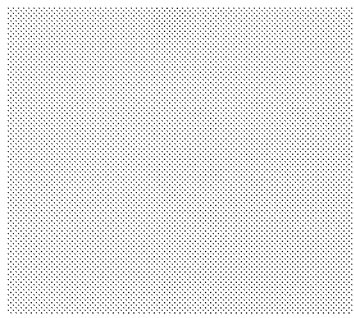
FIGS. 1A-1B depict two images of healthy tissue in different staining qualities.

Said features may be advantageous, as the first and the second classifier and their respective predictions (extended tissue type, contrast level) may represent staining quality indicators whose combined use and evaluation has been observed to allow a particularly accurate determination of the staining quality of a tissue sample depicted in an image or image region. For example, the first classifier may be configured to predict an extended tissue type of the tissue depicted in the image and the second classifier may be configured to predict the contrast level being indicative of the signal to noise ratio in the image. Then the prediction logic may be configured to compute—given the assumption that the extended tissue type predicted by the first classifier is correct, a degree of agreement of the actually observed contrast level in the image to an expected contrast level for the respective extended tissue type category. It has been observed that each extended tissue type is associated with a unique staining pattern which can be accurately modeled and described by the contrast level between the diagnostically relevant region (signal) and diagnostically irrelevant region (noise). Using a first classifier indicating the extended tissue type and the second classifier indicating the contrast level in combination, the prediction logic is able to evaluate how much an expected contrast level (that may e.g. be learned in a training phase) for a particular extended tissue type is in agreement with the actually observed contrast level. The actually observed contrast level is the contrast level determined by the second classifier based on an analysis of extracted image features.

Using a method for assessing the staining quality of a stained tissue section depicted in an IHC image as described herein for embodiments of the invention may be advantageous as an automated method for assessing the staining quality is provided that does not require involving an additional reference laboratory that performs a reference staining process. Embodiments of the invention provide for a particularly accurate and error-robust assessment of the staining quality of a stained tissue depicted in an IHC image. Embodiments of the invention are based on the idea of a) automatically identifying the tissue type of a predefined set of specific, "extended" tissue types (which also take into account tumor-marker presence) based on some image features and b) automatically identifying the contrast level of the image based on image features and the identified tissue type and combining the information obtained in said two steps for assessing the staining quality. It has been observed that taking into account the "extended tissue type status" of the tissue may significantly increase the accuracy of staining quality assessment, because the tumor-marker expression level and/or the type of the tissue may have an impact on the cell density of the tissue and on the diffusivity of the stain into the tissue. Thus, by taking into account the "extended tissue type" as context information for the contrast level, the accuracy of the staining quality assessment and thus the decision whether e.g. a weakly stained image is a "true negative" or a "false negative/understained" tissue may greatly be facilitated. It has been observed that the extended tissue type and the contrast level can be automatically identified from image features. Depending on the embodiment, the set of image features used by the first and the second classifiers can be identical, can show some overlaps or can be completely disjoint. In any case, the independent identification of the extended tissue type and the contrast level and the combined evaluation of said two intermediate results for assessing the staining quality may result in a higher accuracy of staining quality assessment.

An "extended tissue type" as used herein is a tissue type with a defined expression level of the tumor marker. For example, an extended tissue type specifies the type of biological tissue (e.g. healthy tissue, primary-tumor tissue, metastatic tumor tissue) and on the expression status of a tumor-marker (e.g. "expressing the tumor-marker" or "not-expressing the tumor-marker"). "Healthy tissue" is assumed to not express the tumor marker. The total amount of tumor marker that needs to be expressed for a tissue being considered to "express" the tumor-marker may depend on the type of tissue and the type of tumor-marker. Typically, if the expression level of a tumor-marker is at least twice as high as in a typical healthy tissue, the respective tissue expressing the tumor-marker is considered to "express" the tumor marker.

A "classifier" as used herein is a computer-executable program logic adapted to "group" a particular item into one out of two or more different groups (or "classes") of things by assigning a class label to the item or by assigning one or more probability value indicating the likelihood that the item is a member of a particular one of said groups ("statistical classifier"). Depending on the embodiment, the classifier can use various computational approaches for performing the classification, e.g. regression analysis, classification, clustering, applying a trained machine-learning logic or the like. According to preferred embodiments, the first and/or second classifiers are machine-learning logics.

A "machine-learning logic" as used herein is a computer-executable program logic adapted to "learn" from training data, i.e., to process training data and automatically adapt an internal model of the word such that the model better fits to the training data. For example, a machine-learning logic can be a classifier or a regressor that analyzes the training images for the specific tissue-type with available quality annotations and that outputs probability maps from the trained tissue-type and contrast classifiers. A machine-learning logic can be, for example, an artificial neural network (ANN), a support vector machine (SVM), or the like.

A "contrast level" as used herein is a data value that indicates the degree of contrast between pixels within a particular image or image region. According to preferred embodiments, the "contrast level" is an absolute measure. It does not depend on the extended tissue type of a tissue depicted in an image. According to embodiments, the contrast level indicates the intensity contrast between a diagnostically relevant region of the image ("signal") and a diagnostically irrelevant region of the image ("noise"). For example, the diagnostically relevant region can be a foreground region (where a strong signal is expected at least for a particular extended tissue type) or a secondary region (where at least a weak signal is expected at least for a particular extended tissue type). The diagnostically irrelevant region can be a secondary background, e.g. a region of the slide not depicting tissue or depicting tissue that was not contacted with the stain. Various image segmentation techniques may be applied for separating diagnostically relevant regions from diagnostically irrelevant regions.

A "keypoint" as used herein is a location within a digital image that is selected based on measures of its stability in respect to one or more aspects. For example, one or more orientations can be assigned to each keypoint location based on local image gradient directions. All future operations are performed on image data that has been transformed relative to the assigned orientation, scale, and location for each feature, thereby providing invariance to these transformations. The local image gradients are measured at the selected scale in the region around each keypoint for transforming the gradients into a representation that allows for local shape distortion and change in illumination. This approach has been named the Scale Invariant Feature Transform (SIFT), as it transforms image data into scale-invariant coordinates relative to local features. According to embodiments, keypoints are defined as maxima and minima of the result of difference of Gaussians function applied in scale space to a series of smoothed and resampled versions of the received digital IHC image. Low contrast candidate points and edge response points along an edge are discarded. Dominant orientations are assigned to localized keypoints. These steps may ensure that the keypoints are more stable for matching and recognition. SIFT descriptors robust to local affine distortion are then obtained by considering pixels around a radius of the key location, blurring and resampling of local image orientation planes.

According to embodiments, the identification of the extended tissue type of the tissue depicted in each of the digital images comprises computing and outputting, for each of the extended tissue types and for each of a plurality of regions in the image, a probability. The probability is indicative of the probability that the tissue depicted in this region, if any, belongs to said extended tissue type. The identification of the contrast level of the tissue depicted in each of the digital images comprises computing and outputting, for each of a plurality of regions in the image, a probability that the tissue depicted in this region is a "HIGH CONTRAST" tissue and/or is a "LOW CONTRAST" tissue. The method further comprises representing, for each of the extended tissue types and for each predefined contrast level (e.g. "HIGH CONTRAST" and "LOW CONTRAST"), the probability that a tissue region depicted in an image region is member of said extended tissue type or member of said contrast level, as probability value in a probability map. The computing of the staining quality score comprises processing the probability maps.

For example, a first probability map of the digital image could indicate the probabilities of a plurality of image regions of depicting a PT+ tissue. A second probability map could indicate the probabilities of a plurality of image regions of depicting a PT− tissue. A third/fourth/fifth probability map could indicate the probabilities of a plurality of digital image regions of depicting a MT+/MT−/HT tissue. A sixth probability map could indicate the probabilities of a plurality of image regions of depicting a "HIGH CONTRAST" tissue. And a seventh probability map could indicate the probabilities of a plurality of image regions of depicting a "LOW CONTRAST" tissue. According to preferred embodiments, the probabilities computed for the different extended tissue types are combined into a single "extended tissue type probability map" which comprises, for each sub-region of the digital image, the probability that this sub-region depicts any one of the extended tissue types. Thus, in the described example, each sub-region of the "extended tissue type probability map" comprises five probability values. The probabilities computed for the different contrast levels are also combined into a single "contrast level probability map" which comprises, for each sub-region of the digital image, the probability that this sub-region belongs to one of the predefined contrast levels. Thus, in the described example, each sub-region of the "contrast level probability map" probability map comprises two probability values.

According to preferred embodiments, the extended tissue type probability map is computed by the first classifier and the contrast level probability map is computed by the second classifier.

Typically, the probabilities of being a member of one of the tissue classes or of the "HIGH CONTRAST" class will be very low or zero for image regions not depicting any tissue. Representing the results generated by the first and/or second classifier as probability maps of the digital image may be advantageous, as it allows analyzing sub-regions of the image individually, and allows for an easy and intuitive graphical representation in the form of a graphical map on a plot as well as an easy post-processing of the probabilities for computing the staining quality.

According to embodiments, the method further comprises generating the first classifier. The generation of the first classifier comprises receiving a plurality of training images of IHC stained tissue samples of one or more patients. The pixel intensities of each image correlate with the amount of a tumor-marker-specific stain. (in general, the correlation of the pixel intensities and the amount of stain/the amount of antibody to which a chromogen will be bound during the staining is typically non-linear; thus, the pixel intensities provide only an approximate value of the amount of stain and cannot directly be used for quantifying the stain or the tumor-marker). According to some embodiments, the tissue samples depicted in the training images comprise tissue samples of different extended tissue types having been stained with the same tumor-marker-specific stain but with different staining durations and different concentrations of the tumor-marker-specific stain. Each tissue or tissue region depicted in the training images is annotated with one of the extended tissue types. In some embodiments, all depicted tissues are derived from different patients. This may allow generating a non-patient specific first classifier. In other embodiments, all depicted images are derived from the same patient. This may allow generating a patient-specific first classifier. The method comprises automatically extracting a plurality of features from each of the received training images. Then, a first machine-learning program logic is trained with at least some first ones of the extracted features and tissue type annotations of the training images for generating the first classifier as a trained version of the first machine-learning logic. The feature extraction can be performed, for example, by the first machine-learning program or another program operatively coupled to the first machine-learning program.

According to embodiments, the first machine learning logic comprises a model that is configured to classify a tissue region depicted in a digital image into one of a set of predefined extended tissue types based on a plurality of first features for predicting an expected extended tissue type for each of the training images. The training modifies the model such that the error between the predicted and the annotated extended tissue types of the training images is minimized.

According to embodiments, the method comprises generating the second classifier. The generation of the second classifier comprises receiving a plurality of training images of IHC stained tissue samples of one or more patients. The pixel intensities of each image correlates with the amount of a tumor-marker-specific stain. As explained above, the correlation between pixel intensity and amount of stain/tumor-marker is only an approximate and typically non-linear relationship. According to some embodiments, the tissue samples depicted in the training images comprise tissue samples of different extended tissue types having been stained with the same tumor-marker-specific stain but with different staining durations and different concentrations of the tumor-marker-specific stain. Each tissue or tissue region depicted in the training images is annotated with one of the extended tissue types. In some embodiments, all depicted tissues are derived from different patients. This may allow generating a non-patient specific second classifier. In other embodiments, all depicted images are derived from the same patient. This may allow generating a patient-specific second classifier. Each tissue or tissue region depicted in the training images is annotated with one of a predefined set of contrast level labels comprising "HIGH CONTRAST" and "LOW CONTRAST". In some embodiments, the number of predefined contrast level may be higher than two, but typically, the above mentioned two contrast level are sufficient. The generation of the second classifier further comprises extracting a plurality of features from each of the received training images; and training a second machine-learning program logic with at least some second ones of the extracted features, and the contrast level annotations of the training images for generating the second classifier as the trained version of the second machine learning logic.

According to embodiments, the second machine learning logic comprises a model for using the second features for predicting an expected contrast level for each of the training images, whereby the training modifies the model such that the error between the predicted and the annotated contrast levels of the training images is minimized.

Generating the first and/or second classifier by training a machine-learning algorithm may be advantageous, because the classifiers are created automatically in a data-driven manner. Thus, the classifiers can automatically learn to identify the extended tissue type and/or contrast level from one or more image features which were automatically identified during the training as features having predictive power in respect to the tissue type or contrast level class membership.

Moreover, the use of annotated training images depicting tissue samples derived from the same patient and the same tissue type stained with the same tumor-marker-specific stain but with different staining durations and different concentrations of the tumor-marker-specific stain may be advantageous, because the use of different concentration levels and/or the use of different staining durations for the same type of tissue may allow a human annotator and/or an automated annotation logic to clearly distinguish between a "true negative" image (an image correctly identified as not expressing the tumor marker) and a "false negative image" (an image depicting a tumor tissue that is erroneously considered not to express the tumor marker although the tissue is actually understained and expresses the tumor marker).

For example, if the same tissue sample was cut into multiple sub-samples which respectively were stained for different staining durations, and if all digital images depicting one of said sub-samples do not show a strong intensity signal, all said images relating to different staining durations can safely be assumed to be "no-tumor-marker-expressing/true negative" tissue samples and the corresponding training images can safely be annotated with their physical tissue type in combination with the information that this tissue does not express the tumor-marker (e.g. healthy, PT−, MT−). "Healthy tissue" does per definition not express a tumor marker. If, however, at least one of the digital images (e.g. the one with the longest staining duration) shows a strong, high-contrast intensity signal, all said images relating to different staining durations but derived from the same tissue and patient can safely be assumed to be "tumor-marker-expressing" tissue samples and the corresponding training images can safely be annotated with their physical tissue type in combination with the information that this tissue does express the tumor-marker (e.g. PT+, MT+).

To give a further example, if the same tissue sample was cut into multiple sub-samples which respectively were stained for a defined staining duration with multiple different stain concentrations (e.g. multiple different concentrations of the primary antibody adapted to selectively bind to the tumor-marker), and if all digital images depicting one of said sub-samples do not show a strong intensity signal, all said images relating to different stain concentrations can safely be assumed to be "no-tumor-marker-expressing/true negative" tissue samples and the corresponding training images can safely be annotated as healthy, PT−, or MT− tissue. If, however, at least one of the digital images (e.g. the one with the highest stain concentration) shows a strong, high-contrast intensity signal, all said images relating to different stain concentrations but derived from the same tissue and patient can safely be assumed to be "tumor-marker-expressing" tissue samples and the corresponding training images can safely be annotated with their physical tissue type in combination with the information that this tissue does express the tumor-marker (e.g. PT+, MT+).

Thus, generating for one or more different staining parameters (e.g. stain concentration, staining duration, etc.) different stained tissue samples from the same tissue section of the same patient may allow to generate annotated training images which are robust against particularities of individual patients and tissue types, because for each patient and tissue type, multiple staining parameters are evaluated and because the combinations of images corresponding to series of different staining parameter values comprise enough information to allow to annotate the training images such that the negative impact of sub-optimal staining parameter values can be compensated.

The above mentioned approach for generating a first and/or second classifier and using the classifiers for staining quality assessment may have the advantages over the method disclosed in M. Grunkin et al. and Pinard et al. cited above that an individual contribution of individual staining parameters to the staining quality can accurately and automatically be assessed. Moreover, the quality assessment logic is learned from the data, i.e., it is a data driven approach for assessing how the staining quality is affected by the variability of the process parameters.

According to embodiments, the first features used for generating the first classifier and the second features used for generating the second classifier can be identical, can belong to overlapping sets or can belong to disjoint sets of features.

According to embodiments, the computing of the staining quality score is performed by a computer program logic referred herein as "prediction logic". The method further comprising generating the prediction logic. The generation of the prediction logic comprises receiving a plurality of training images of IHC stained tissue samples of one or more patients. The pixel intensities of each image correlate with the amount of a tumor-marker-specific stain. The depicted tissue samples have been stained with the same tumor-marker-specific stain but with different staining durations and different concentrations of the tumor-marker-specific stain. For example, the same set of training images as used for generating the first and/or second classifier may be used for generating and training the prediction logic. Each tissue depicted in the training images are annotated with a staining quality score or a staining quality label. The annotation can be performed, for example, by a pathologist who takes into consideration the effect of individual staining parameters such as duration and stain concentration on a particular tissue sample derived from the same patient and tissue source. The generation of the prediction logic further comprises applying the first and the second classifier on each of the training images for computing, for each of the training images, a plurality of probability maps. The probability maps indicate the probabilities of respective image regions of depicting a tissue that belongs to one of the extended tissue types and of depicting a tissue in a particular one of the contrast levels. The generation of the prediction logic further comprises training a machine-learning logic on the probability maps of the training images such that an error between the annotated staining quality scores or labels and predicted quality scores or labels computed as a function of the probability maps is minimized.

The automated and independent generation and training of the first and/or second classifier and of the prediction logic may be advantageous, as it may allow to re-train and improve either the first or the second classifier and then the prediction logic as soon as additional training images are available. Thus, in case the training data set is supplemented with further training images, an even more accurate first and/or second classifier and prediction logic can be generated simply by re-training the first and/or second classifier or the prediction logic on the supplemented version of the training data.

According to embodiments, the method further comprises generating the training images. The generation comprises applying a plurality of IHC staining protocols differing from each other by at least one parameter value on a plurality of training tissue samples derived from the same patient. The plurality of IHC staining protocols are applied such that:

at least a first series of IHC staining protocols using different staining durations are applied;

at least a second series of IHC staining protocols using different concentrations of the tumor-marker-specific stain are applied; and for each of the staining durations of the first series at least two different stain concentration are applied and for each of the stain concentrations of the second series at least two different staining durations are applied.

As described above, this may be advantageous as this procedure generates a set of training images in which the contribution of each individual staining parameter to the resulting staining effect is visible and can be used for correctly annotating respective training images.

According to embodiments, the training tissue samples belong to different tissue types.

The different tissue types comprise at least:

PT tissue; the PT tissue is tissue comprising or consisting of primary tumor tissue;

MT tissue; MT tissue is tissue comprising or consisting of metastatic tumor tissue; and HT tissue; HT tissue is healthy tissue located in spatial proximity of the primary tumor or of a metastasis.

According to embodiments, the at least one parameter value is a staining duration value or a concentration of a tumor-marker-specific stain.

This may be beneficial because it has been observed that generating training images based on series of different staining durations and/or concentrations of the same tissue source may allow generating classifiers and a prediction logic that is able to accurately determine the staining quality of a tissue depicted in a digital image and/or to accurately determine a parameter range suitable for producing high quality staining images.

According to embodiments, the application of the plurality of staining protocols comprises applying the plurality of staining protocols on different regions of the same tissue section by using a vertical microfluidic probe system.

Micro-immunohistochemistry (μIHC) is a method for staining tissue sections at the micrometer scale. Contrary to conventional IHC, μIHC uses nanolitres of antibody solutions which are confined over micro-meter-sized areas of tissue sections using a vertical microfluidic probe (vMFP). μIHC with vMFP preserves tissue samples and reagents and alleviates antibody cross-reactivity issues. Therefore, vMFP systems have been used for the staining of individual cores of tissue microarrays (TMAs) with multiple antigens. It has been observed that vMFP systems are not only useful for preserving stain, but also for generating training images and test images such that for a given patient and tissue source, a plurality of staining conditions can be evaluated. This is achieved by staining, in a given tissue section, only selected sub-regions of the tissue, e.g. regularly-spaced dots, according to a staining protocol that is specific for each dot. For example, a matrix of staining dots can be created by a vMFP System, whereby all dots in a first column are stained with a first concentration of the stain, all dots in a second column are stained with a second concentration of the stain and all dots in a third column are stained with a third stain concentration. Moreover, all dots in the first row are stained for a first staining duration, all dots in the second row are stained for a second staining duration and all dots in the third row are stained in a third staining duration. Thus, for a single tissue section of a patient, a plurality of staining protocols is applied and tested, whereby the staining parameters, e.g. the stain concentration and staining duration, vary. Thus, vMFP technique can not only be used for saving stain, but also for experimentally determining, for each patient and each tissue section individually, the one of the dots (digital image regions) having the highest staining quality score and thus probably being the most reliable basis for image-based medical diagnostics.

Preferably, vMFP technique is used both for generating the training images that are to be annotated manually and for generating multiple test images of each tissue sample of a currently examined patient.

For example, from a currently examined patient, three tissue samples can be derived: a first sample from healthy tissue next to a primary tumor, a second sample from the primary tumor and a third sample from a metastasis. On each of said three tissue samples, a matrix of dots of a staining solution is applied and for each of the dots a staining protocol is performed that differs from the staining protocols of all other dots of the tissue sample by one or more parameter values, in particular the stain concentration and/or staining duration. Thus, a wide range of staining conditions is applied and tested on a single tissue section. Hence, vMFP systems can be used to find the optimum combination of staining parameter values and/or to create high-quality annotated sets of training images having assigned the "real" tumor-marker expression status of each tissue. The use of vMFP systems is described for example in R. D. Lovchik, G. V. Kaigala, M. Georgiadis and E. Delamarche. "Microimmunohistochemistry using a microfluidic probe." Lab Chip, vol. 12(6), pp. 1040-1043, March 2012. A primary antibody at a particular concentration is injected into one channel of the probe and is allowed to interact with an underlying tissue section. The antibody binds to the antigens in the tissue section after a specified incubation time. Then, the antibody is aspirated through the aspiration channel of the probe. To visualize the primary antibody, a secondary antibody bound to an enzyme is applied. The activity of the enzyme produces a colored complex, which indicates the underlying proteomic profile in the tissue sample. The obtained proteomic profile is a function of the supplied antibody dilution and the allowed incubation time.

According to embodiments, the method further comprises segmenting the received digital image (whose staining quality is to be assessed). The segmentation method described in the following for embodiments of the invention can likewise be applied on each of the training images as a preprocessing step for enabling the extraction of segment-related features from the training images. In addition, or alternatively, the segmentation can be performed on each of a plurality of digital IHC images received for automatically identifying suitable staining parameter ranges for enabling the extraction of segment-related features from each of the plurality of received digital IHC images.

According to embodiments, the segmentation comprises:
identifying the primary background of the image; the primary background depicts tissue regions not brought in contact with the stain; for example, in case of using vMFP, all tissue regions and non-tissue regions, if any, which are not covered by a "staining dot";
identifying a footprint region in the image; the footprint region depicts a region in the image which was brought in contact with the stain; the footprint region is identified by subtracting the primary background from the received digital image; for example, the footprint region can be an individual dot in an image of a vMFP stained slide;
selectively analyzing the footprint region for identifying the foreground region within the footprint region; the foreground region depicts stained tissue regions expressing the tumor-marker; the foreground region corresponds to a diagnostically relevant region and signals received from the foreground are considered as diagnostically relevant signals;
selectively analyzing the footprint region for identifying the secondary background within the footprint region, the secondary background depicting tissue regions not supposed to express the tumor-marker; the secondary background corresponds to diagnostically irrelevant regions of the image and signals from the secondary background region are considered as diagnostically irrelevant signals.

The contrast level can be computed as the contrast between the foreground and the secondary background and may thus represent the signal to noise ratio for diagnostically relevant/irrelevant signals. Selectively analyzing the footprint region for identifying the foreground and the secondary background may be advantageous as computational resources are saved. Moreover, it has been observed that the above described four segment types may allow for the extraction of many segment-related features which have good predictive power in respect to tissue type and contrast level, and thus in respect to staining quality.

According to embodiments, the identification of the primary background comprises receiving the digital image as an RGB image. The stained tissue regions correspond to low-intensity image regions and unstained tissue regions correspond to high intensity image regions. The method further comprises converting the RGB image into a grayscale image and inverting the grayscale image such that stained tissue regions correspond to high-intensity image regions and unstained tissue regions correspond to low-intensity image regions.

In some embodiments, the grayscale image is further processed, e.g. by adjusting the contrast of the inverted image via a round of histogram equalization and/or by smoothing the adjusted image by convolving the adjusted image with a low-pass filter kernel.

According to embodiments, the image segmentation further comprises extracting a footprint mask by applying a non-parametric marker-based Watershed algorithm on the inverted grayscale image and extracting the footprint region in the received digital image as the region of the digital image not masked by the footprint mask.

For example, the generation of the footprint mask can comprise:
applying Otsu thresholding for receiving a threshold value (val_thr);
applying the threshold on the inverted grey scale image for generating a binary version of the grey scale image, the binary version selectively comprising pixels whose intensity value is above the threshold value (val_thr);
compute a further threshold value val_thr2 by adding a predefined value, e.g. 20, to the threshold value: val_thr2=val_thr+20; the predefined value, e.g. 20, is chosen such that the resulting threshold value val_thr2 selectively selects pixels with intensity values as high as typically expected for a given tumor-marker of interest as stained pixels;
applying the threshold val_thr2 on the received digital image (e.g. the RGB image) and further optionally apply erosion to select the surely foreground pixels from the received image; the generated selected regions of the received digital image is also referred to as "ret_stained" image;

applying dilation on the 'ret_stained' image for increasing the width of the stained regions in the ret_stained image, thereby generating a dilated image referred to as "dil_ret_stained" image;

applying inverted binary thresholding on the "dil_ret_stained" image to determine the surely background pixels; and using the surely foreground and surely background pixels as markers in a Watershed algorithm and applying the Watershed algorithm on the received digital image, thereby generating the footprint mask.

Thus, in some embodiments, applying the Watershed algorithm for generating the footprint mask can comprise: a) finding an approximate estimate of the footprint by Otsu binarization (thresholding); b) performing morphological erosion and dilation on the footprint mask already generated to generate markers to determine the regions which surely belong to the footprint and primary background respectively. The remaining regions are those which we are uncertain whether they belong to the footprint or background. The Watershed algorithm is then applied again on the uncertain regions with the generated markers to assign the uncertain regions into the footprint mask and background mask. The method may allow for automatically identifying the footprint region may be provided that generates a mask which, when applied on the inverted grey scale image (foreground appearing white) may obtain the probable regions being foreground.

According to embodiments, the identification of the foreground region comprises calculating a histogram of the pixel intensities of the footprint region. For example, a 16 bin histogram can be created. The histogram may allow identifying the "most occurring intensity value". The method comprises:

calculating a histogram of the pixel intensities of the footprint region;

identifying a highest-frequency-bin in the histogram, the highest-frequency-bin being the one of the histogram bins comprising the highest number of intensities observed in the image;

identifying a highest-intensity bin in the histogram, the highest-intensity-bin being the one of the histogram bins that comprises the highest intensities observed in the image and which in addition comprises more than a predefined threshold of the total pixels in the histogram; for example, the highest-intensity bin can be a bin that represents the highest intensities in the histogram and in addition comprises at least 1% of the total pixels in the histogram;

identifying a first maximum intensity, the first maximum intensity being the maximum intensity of the highest-frequency-bin;

identifying a second maximum intensity, the second maximum intensity being the maximum intensity of the highest-intensity-bin;

computing the mean of the first and the second maximum intensities;

generating a foreground mask by using the computed mean as threshold value, the foreground mask hiding all pixels in the footprint region whose intensity values is below said "mean-derived" threshold;

identifying the foreground region by applying the foreground mask on the footprint region of the received digital image. Only the pixels of the footprint region which are not hidden by the foreground masks are used as foreground pixels.

For example, an image may comprise pixel intensities in the range of 0-100. A histogram is computed comprising a first bin for pixel intensities 0-10, a second bin for pixel intensities 11-20, a third bin for pixel intensities 21-30 and so on and a "10th bin" for pixel intensities 91-100. The bin for intensities 41-50 may be identified as the bin that comprises the highest number of intensities observed in the digital image. The $10^{th}$ bin may comprise less than 1% of the observed intensities, so the bin 81-90 is identified as the "highest-intensity-bin. Then, the first maximum value is identified, e.g. 50. Then, the second maximum intensity value is determined. The second maximum intensity value can be, for example, 88 in case the maximum-intensity-bin does not comprise an occurrence for the intensities 89 and 90. Then, the mean of 50 and 88 is computed as (50+88)/2=69.

Said features may be advantageous, as the selection of an appropriate threshold for generating the foreground mask is crucial for an accurate segmentation. However, obtaining this threshold is error prone. For example, thresholds which are derived from the maximum intensity values in an image may reflect too high intensity values as s the image may contain artifacts (e.g. few small black rectangles), which will appear as white (maximum intensity) noise in the inverted grey scale image. By selecting the bin lying as far as possible after the 'most occurring intensity' bin but still containing more than 1% of total pixels used in the histogram, and by using the mean intensity value of the selected bin as the bin-based threshold for generating the foreground mask, artifacts may be removed, because artifacts whose pixel intensities are represented in the last bin of the histogram are not used as basis for a segmentation step. Thus, a method for defining a robust threshold value for detecting the actual foreground is provided.

According to embodiments, the identification of the secondary background comprises:

dilating the foreground mask for generating a dilated foreground mask; for example, the foreground mask can be dilated by 5 iterations of dilation with a kernel size of 7×7. As the result of the dilation, a "dilated-foreground-mask" is generated;

subtracting the foreground mask from the dilated-foreground mask for obtaining a precursor-secondary-background; the dilation may overlap some foreground region. Therefore, the foreground mask is subtracted from the "dilated-foreground-mask", as the purpose is to identify secondary background and "known" foreground pixels should not be considered as secondary background pixels;

performing a morphological closing operation in the precursor-secondary-background to fill in the holes and preserve the connectivity of the precursor-secondary-background; there may be some void spaces in the "precursor secondary-background", which are not foreground pixels (as the foreground pixels were subtracted in the previous step. Filling those gaps allows maintaining the connectivity of the secondary background.

subtracting the foreground mask from the resulting filled precursor-secondary background mask to generate the secondary background mask, thereby ensuring that no foreground pixels are included in the secondary background mask; and the morphological closing operation might have overlapped some foreground pixels, so a final check to remove any remaining foreground pixels is performed.

apply the secondary background mask on received digital image to obtain the secondary background. Preferably, the secondary background is selectively applied on the footprint regions.

In the secondary background regions, false positive staining occurs owing to the staining of stromal cells and extracellular space. By excluding the detected foreground region inside the footprint, the staining in the remaining portion is considered as secondary background. From the stained images it is observed that usually this secondary background false staining occurs near the foreground, so detecting the secondary background within a proximity from the detected foreground as described above may allow to accurately avoid false positive signals.

According to embodiments, the extraction of the features from the received digital image comprises extracting global features derived from all pixels in the image (e.g. intensity-based features, segmentation statistics and SIFT based morphological features) and extracting local features from patches within the images (e.g. from patches within the foreground region to capture local structural and morphological information). It has been observed that a combination of global and local features may allow for a particularly accurate classification of images in accordance with the extended tissue type or contrast level of the tissue depicted in the image or image region.

According to embodiments, the extraction of the global features comprises performing the segmentation according to any one of the embodiments described herein, and computing one or more segmentation statistics features from the image segments. The segmentation statistics features are selected from a group comprising:

percentage of foreground pixels within the whole received image, percentage of foreground pixels within the footprint regions, percentage of footprint region pixels within the whole image;

In addition or as an alternative to computing the segmentation statistics features, the method comprises computing one or more intensity features from the image segments. The intensity features are selected from a group comprising:

Mean intensity of foreground pixels;

Mean intensity of footprint region pixels;

Mean intensity of secondary background pixels;

ratio of mean pixel intensity in the foreground region and mean pixel intensity in the secondary background, the ratio representing a signal-to-noise ratio.

According to embodiments, the extraction of the global features comprises performing the segmentation according to any one of the embodiments described herein; applying difference of Gaussian filters with different values selectively on the foreground region of the image to obtain multiple keypoints; and extracting Scale-Invariant Feature Transform (SIFT) features in spatial proximity to the keypoints. For example, the SIFT features can be extracted in the form of a 128 dimensional feature vector as described for example in D. G. Lowe, "Distinctive Image Features from Scale-Invariant Keypoints", International Journal of Computer Vision, vol. 60, no. 2, pp. 91-110, 2004.

Extracting SIFT features may be advantageous as a large numbers of stable features that densely cover the image over the full range of scales and locations can be generated.

According to embodiments, the feature extraction further comprises combining the global features, e.g. the SIFT features and/or other global features, and local features such that a feature vector of predefined length is generated for the image. The length of the feature vector is identical for all images from which the features are extracted.

According to embodiments, the generation of the feature vector of predefined length comprises:

applying difference of Gaussian filters with different values selectively on the foreground region of the image to obtain multiple keypoints;

extracting a multi-dimensional (e.g. 128 dimensional) feature vector at every keypoint, whereby different images have a different foreground region sizes and different numbers of identified keypoints;

for each integer j, 0<j<N, N being a predefined maximum integer N, compute the following:

applying a K-means clustering for grouping all keypoints of the image into the currently evaluated number "j" of clusters;

assigning to each keypoints the cluster index (i.e., an identifier) of the one of the j clusters to which it is assigned;

computing the Bayesian Information Criterion (BIC) score $BIC_j$ of the clustered keypoints.

For example, in case the number N is 6, the clustering is performed a first time such that one cluster (j=1) is obtained, the clustering is then performed a further time such that two clusters (j=2) are obtained, and so on, until finally the clustering is performed a further time such that j=N−1=6−1=5 clusters are obtained. For each iteration, the BIC score of the clusters is computed.

Then, the method comprises automatically evaluating all BIC scores $BIC_1, \ldots, BIC_{N-1}$ for identifying an optimum number $j_{opt}$ of keypoint clusters;

binning the keypoints into the identified number $j_{opt}$ of cluster bins, wherein each cluster bin corresponds to one of the $j_{opt}$ clusters; the binning can comprise counting the number of keypoints in each bin; and using the $j_{opt}$ bins as a $j_{opt}$-dimensional feature signature for the whole image, the dimension of the feature signature being the same for all received images (irrespective of the size of its foreground region).

This may allow harmonizing feature vector sizes across images and may advantageously be applied in case of SIFT features. So the above approach may allow combining the feature representations of the individual keypoints to form a single fixed-dimensional representation for the entire image that is constant for all analyzed images.

According to embodiments, the method further comprises:

performing the segmentation according to any one of the embodiments described herein;

computing the ratio of mean pixel intensity in the foreground region and mean pixel intensity in the secondary background; and using the computed ratio at least as one of the second features provided to the second classifier for computing the contrast level. According to embodiments, this ratio is also used by the first classifier as one of the features evaluated for computing the likelihoods of the extended tissue type memberships.

Using the ratio of mean pixel intensity in the foreground region and mean pixel intensity in the secondary background as an input feature both of the first and the second classifier may be advantageous as it has been observed that this feature has a high predictive power both in respect t extended tissue type membership and in respect to contrast level membership.

Depending on the embodiment, both classifiers may use all the extracted features, e.g. the mean foreground to mean secondary background intensity ratio.

According to embodiments, the extraction of local features from an image comprises:
- dividing the image into overlapping patches of pixels;
- moving a window of patch-size across the image.

The moving of the window comprises, upon the sliding window covering a new current patch:
- determining if the pixels in the current patch meet a predefined criterion; for example, the criterion can be that a minimum number of patch pixels, e.g. 30%, are foreground pixels;
- selectively in case the criterion is fulfilled, processing the pixels of the current patch for extracting a local feature from the current patch. For example, a grey level co-occurrence matrix based texture feature, spatial/frequency domain features based on wavelet transforms such as Gabor, DWT, DWPT and DTCWT can be extracted from the patch.

According to embodiments, the extraction of the local features comprising, for each of the patches fulfilling the criterion, computing a texture feature selected from a group comprising a Gray-Level Co-occurrence Matrix (GLCM)-based feature and an image gradient feature.

A GLCM is a description of how often different combinations of pixel intensities occur in an image, object or local neighborhood. GLCM transforms an image into a matrix according to the relationship of pixels in the original image. According to preferred embodiments, contrast and entropy GLCM features are extracted from the GLCM matrix of the image or image patch. For example, the extraction of GLCM features is described in R. M. Haralick, K. Shanmugam and I. Dinstein: "Texural features for image classification", IEEE transaction on systems, man and cybernatics, vol. 3(6), pp. 610-621, November 1973.

The image gradient feature is selected from the group comprising:
- mean and/or standard deviation of a gradient magnitude computed for each pixel in the patch;
- Tenengrad response of the pixels in the patch;
- sharpness of the patch;
- blurriness of the patch.

The image gradient features are another form of texture features, independent of GLCM. For example, the image gradient features are extracted based on the methods mentioned in X. Lopez, E. D'Andrea, P. Barbot, A. S. Bridoux, S. Sandrine, I. Salmon, O. Debeir and C. Decaestecker. "An automated blur detection method for histological whole slide imaging." PLoS ONE, vol. 8(12), December 2013.

According to embodiments, the method comprises performing the segmentation according to any one of the embodiments described herein. The extraction of the local features comprises, for each of the patches fulfilling the criterion, computing a spatial feature. The spatial feature is selected from a group comprising a Gabor wavelet transform feature, a discrete wavelet transform (DWT) feature, a texture feature and a dual-tree complex wavelet transform (DTCWT) feature.

Gabor filter family belongs to the group of wavelet transformation, which performs multi-channel representation in-line with the multi-channel filtering mechanism of the human visual system in perceiving visual information. It captures unique visual information through a set of Gabor filters with various orientations and scales. The extraction of Gabor wavelet transform features is performed, for example, in accordance with J. Han and K. K. Ma. "Rotation-invariant and scale-invariant Gabor features for texture image retrieval." Journal of Image and Vision Computing, vol. 25, pp. 14741481, 2007 which is incorporated herewith by reference in its entirety.

Discrete Wavelet Transform (DWT) as used herein is any conventional wavelet transformation, where the wavelets are sampled discretely. Computing DWT features may allow for good temporal resolution, both in frequency and spatial domain. The extraction of a DWT feature is described, for example, in the following documents which are included herewith by reference in their entirety:

S. Livens, P. Scheunders, G. V. de Wouwer, D. V. Dyck, H. Smet, J. Winkelman and W. Bogaert. "A Texture Analysis Approach to Corrosion Image Classification." Journal of Microscopy, Microanalysis, Microstructures, vol. 7(2), pp. 1-10, 1996.

H. Shan, X. Chao, G. WeiQiao, T. Yong and L. Yan. "Texture feature extraction based on wavelet transform and gray-level co-occurrence matrices applied to osteosarcoma diagnosis." Journal of Bio-Medical Materials and Engineering, vol. 24, pp. 129143, 2014.

M. Jian, H. Guo and L. Liu. "Texture Image Classification Using Visual Perceptual Texture Features and Gabor Wavelet Features." Journal of Computers, vol. 4(8), August 2009.

According to some embodiments, the DWT features are extracted as follows: the DWT algorithm decomposes the received digital image or a particular image patch into four sub-band images by passing it through discrete-time low and high pass quadrature mirror filters. DWT decomposition is repeated by extending the decomposition process into multiple levels. The frequency resolution increases with the increase in depth of decomposition. In DWT, each level is calculated by passing only the previous wavelet approximation coefficients through discrete-time low and high pass filters.

Dual-Tree ComplexWavelet Transform (DTCWT) is an enhancement to DWT. DWT in some occasions suffers from the drawback of shift variance, i.e. a small shift of the input signal may cause significant fluctuations in the energy distribution of wavelet coefficients. To overcome these shortcomings of DWT, DTCWT features are computed instead of or in addition to DWT features. For example, DTCWT features can be extracted from image patches in accordance with N. Kingsbusy. "The dual-tree complex wavelet transform: A new technique for shift-invariance and directional filters." Proceeding of the IEEE Digital Signal Processing Workshop, pp. 120131, 1998 which is incorporated herewith by reference in its entirety. DTCWT features provide for both good shift invariance and directional selectivity. It is based on the use of two separate DWT decomposition, one producing the real coefficients and the other producing the imaginary. These trees provide the signal delays necessary for every level and hence eliminate aliasing effects and achieve shift invariance.

According to some embodiments, the extraction of DTCWT features is performed according to the method described in example, in P. Yang and G. Yang: "Feature extraction using dual-tree complex wavelet transform and gray level co-occurrence matrix" Neurocomputing, vol. 197, pp. 212-220, 2016 which is incorporated herein by reference in its entirety.

According to embodiments, the tumor is breast cancer, the tumor-marker is Her2 and the tumor-marker-specific stain is a primary antibody adapted to selectively bind to Her2 and adapted to be coupled directly or indirectly to a stain, e.g. a fluorescent stain, during the staining process.

In a further aspect, the invention relates to an image analysis method for automatically determining, for one or more staining protocol parameters of an IHC staining protocol, a respective parameter value range that will result in a staining of a tissue sample with a tumor-marker specific stain that fulfills predefined staining quality requirements. The method comprises:

receiving a plurality of images of one or more IHC stained tissue samples belonging to multiple different extended tissue types, the pixel intensities of each image correlating with the amount of a tumor-marker-specific stain, the depicted tissue samples having been stained with the same tumor-marker-specific stain but with different values of each of the one or more staining protocol parameters;

extracting a plurality of features from each of the received digital images;

automatically analyzing the extracted features for identifying an extended tissue type and a contrast level of each of the tissue samples, the extended tissue type being selected from a set comprising:

PT+ tissue, the PT+ tissue being tissue comprising or consisting of primary tumor tissue that expresses the tumor-marker;

PT− tissue, the PT− tissue being tissue comprising or consisting of primary tumor tissue that does not expresses the tumor-marker;

MT+ tissue, the MT+ tissue being tissue comprising or consisting of metastatic tumor tissue that expresses the tumor-marker;

MT− tissue, the MT− tissue being tissue comprising or consisting of metastatic tumor tissue that does not expresses the tumor-marker;

HT tissue, the HT tissue being healthy tissue located in spatial proximity of the primary tumor or of a metastasis;

for the tissue depicted in each of the received images, computing a staining quality score as a function of the identified extended tissue type and the identified contrast level of the tissue;

performing, for each of the one or more staining protocol parameters:

for each of the extended tissue types:

identifying all images depicting a tissue of said extended tissue type for which a quality score that exceeds a quality threshold was computed;

identifying the minimum and maximum staining parameter value used in the staining protocols that were applied for staining the tissues depicted in said identified images;

returning a staining parameter value range for the staining protocol parameter, the range being delimited by the identified minimum and maximum values.

This may be advantageous, because a minimum and maximum staining parameter value, i.e., a parameter value range is automatically identified for a given tissue type and tumor-marker/tumor-marker specific stain that will result in a high quality staining of the tissue. Applicant has surprisingly observed that the optimal parameter range for many staining parameters strongly depends on the individual tumor marker, stain, tumor type, tissue type and even on the individual patient. The method may allow to identify the optimum parameter value ranges for multiple different parameters efficiently, accurately and reproducible. This is often not possible by the "state of the art approach" which basically consists of testing a comparatively limited set of staining parameter value combinations and manually inspecting whether or not the achieved results fulfills some staining quality requirements. To the contrary, the above method allows to identify optimal staining parameter ranges systematically for many different staining parameters in a reproducible manner.

According to embodiments, the received plurality of images comprises tissue images from many different patients. In this case, an optimum parameter range for a particular combination of stain, tumor marker and tissue type can automatically be identified. The obtained parameter ranges can be used for staining tissue sections of different tissue types separately in dependence on the tissue type. Applicant has observed that different tissue types (primary tumor, metastasis, healthy tissue) may have different optimum staining parameter ranges. This finding may be caused by different physiological properties of the tissue sections, e.g. differences in cell density, differences in cell type composition and the like. By identifying optimum staining parameter ranges based on images of a plurality of different tissue types and patients, an automated method for identifying staining parameter value ranges is provided that will yield high quality staining for most of the patients.

According to preferred embodiments, the optimum parameter ranges obtained by performing the above method on IHC tissue images of many different patients are used for staining multiple different tissue sections of a single particular patient. Again, each tissue section of the patient is stained in accordance with many different staining protocols which differ from each other by at least one staining parameter value, e.g. staining duration or stain concentration. Thereby the parameter values of the staining protocols applied on the tissue samples of the particular single patients all lie within the previously identified optimal staining parameter ranges. Again, the feature extraction and quality determination steps are executed for each of the multiple images of the same patient for identifying, for each staining parameter, a minimum and maximum staining parameter value for this individual patient. Thus, embodiments of the invention may be used to determine, in a first step, optimum staining parameter ranges on data of a plurality of patients and to determine, in a second step, based on the parameter value ranges of the first step, patient-specific optimum staining parameter ranges on image data derived from this particular patient. It has been observed that differences between patients regarding the optimum staining parameters exist. However, state-of-the-art approaches based on testing a limited set of parameter combinations manually in the wet-lab were not able to address patient-related variability of the optimum staining parameters. To the contrary, embodiments of the invention may allow to automatically identify the optimum staining parameter range for individual patients, and to optionally repeat the staining on additional tissue sections based on the patient-specific optimum staining parameter ranges.

Thus, according to some embodiments, the plurality of the received images comprise or consist of multiple images of tissue samples of one or more tissue types of the same patient, the tissue samples having been stained with different staining protocols (which differ from each other by one or more staining parameter values). This may be advantageous as these images allow estimating the contribution of individual staining parameters to the final staining quality in a patient-specific manner.

According to embodiments, the staining quality score is computed by applying the method of any one of the embodiments of the method for computing the staining quality if IHC images described herein.

According to embodiments, the method further comprises generating, for each of the extended tissue types, a respective a multi-dimensional staining quality plot. At least two plot dimensions respectively represent one of the staining protocol parameters used for staining the tissues depicted in the received images. The staining quality scores computed for each staining protocol value is graphically represented in the form of a grey-level scale or color scale or in the form of a further dimension of the staining quality plot. The method further comprises presenting the staining quality plot on a display screen for enabling a user to manually select, selectively for the extended tissue type for which the staining quality plot was generated and for each of the staining protocol parameters, a parameter value range that corresponds to high quality tissue staining.

This may be advantageous as an intuitive graphical representation of optimal (or "suitable") staining parameter ranges is provided that allows a user to easily recognize, separately for each parameter and tissue type, suitable staining parameter value ranges.

Regardless of whether the IHC-stained tissue is examined by a pathologist or an algorithm, the staining quality is of great importance for accurate diagnosis of cancer. Especially some key parameters in staining process, such as antibody concentration (dilution) and incubation (residence) time, have shown great influence on the quality of the staining. For instance, improper process parameters can lead to false positive and false negative staining (see FIGS. 1A-1B and FIGS. 2A-2C). Such false staining can negatively influence the diagnosis, and therefore, it may lead to inappropriate treatment modalities.

According to embodiments, the method comprises generating, for each of the extended tissue types depicted in the received digital images, a respective multi-dimensional sensitivity plot. At least two plot dimensions of the sensitivity plot respectively represent one of the staining protocol parameters used for staining the tissues depicted in the received images. The degree of sensitivity of the staining quality from a staining protocol parameter combination is graphically represented in the form of a grey-level scale or color scale or in the form of a further dimension of the sensitivity plot. The method further comprises presenting the sensitivity plot on a display screen for enabling a user to manually select, selectively for the extended tissue type for which the sensitivity plot was generated and for each of the staining protocol parameters, a parameter value range that a parameter value range that is free of parameter values for which a sensitivity maximum is indicated by the sensitivity plot.

According to preferred embodiments, both the staining quality plot and the sensitivity plot are displayed on a screen, thereby enabling a user to select a parameter value range that is a good compromise between staining quality and robustness of the protocol: parameter values at which a high staining quality score in the staining quality plot and a low sensitivity of the staining quality to parameter value variations in the sensitivity plot were observed are preferably selected as parameter values that represent optimal staining protocol parameter values.

According to embodiments, the staining parameter value ranges obtained from the staining quality plot and/or the sensitivity plot are used for staining further tissue samples of the same patient or of a different patient, thereby ensuring that the tissue of the already examined patient or of a patient having the same tumor type as the patient based on whose image data the optimal staining parameter values were obtained, is stained under optimal staining conditions.

Figure 1B:

FIG. 1A-1B depict two images of healthy tissue in different staining qualities, whereby FIG. 1A depicts healthy tissue in which cells are not expressing the protein (Her2) and is an example for a good quality staining and whereby FIG. 1B shows an overstained healthy tissue and is an example for a low quality staining image (here: a false positive staining).

Figure 2A:
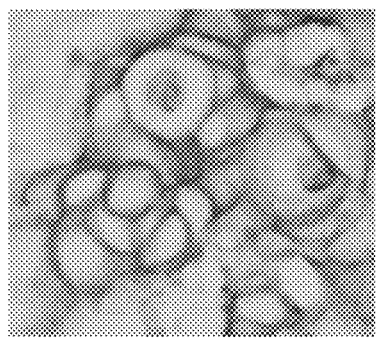
FIGS. 2A-2C depict three images of tumor tissue in different staining qualities.
Figure 2B:
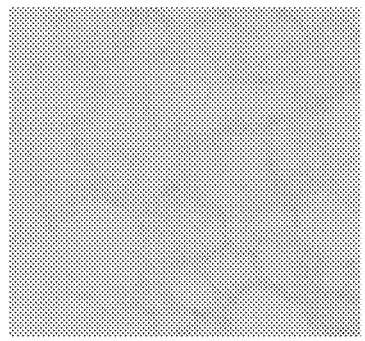
Figure 2C:
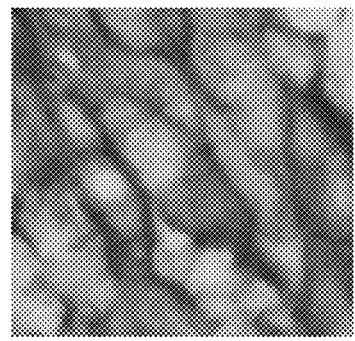

FIGS. 2A-2C depict three images of a tumor tissue that over-expresses the Her2 protein, an important prognostic tumor-marker. FIG. 2A depicts a high-quality staining image, FIG. 2B an under-stained image of the tumor tissue that lacks contrast and FIG. 2C an image of an over-stained tumor tissue.

Figure 3A:
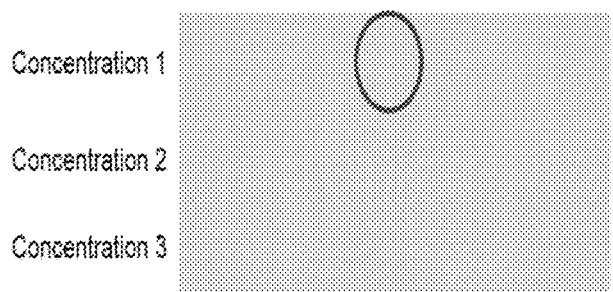
FIGS. 3A-3B depict a scheme illustrating the use of multiple images for quality assessment.
Figure 3B:
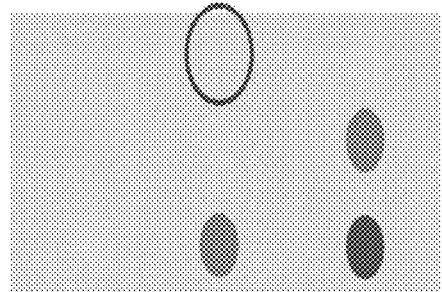

FIG. 3A-3B depict a scheme illustrating the use of multiple images for assessing the impact of individual staining parameters on the staining quality. The under- and over-staining of tissues depicted e.g. in FIGS. 1A-1B and FIGS. 2A-2C is typically caused by the selection of wrong staining parameters. Conventionally, pathology laboratories use different parameters to achieve optimal staining quality defined by qualitative assessments.

In the following, the creation and annotation of training images will be described which are annotated based on a specific concept of what a "good" or "bad" image is and how it can be determined.

For example, a standard IHC staining protocol may comprise embedding a tissue block in wax, generating a tissue sample by cutting a sample from the block, dewaxing the sample, applying a primary antibody on the sample that should selectively bind to the tumor-marker, wash the stained sample, apply the secondary antibody and chromogen, wash a further time after a defined incubation time, and capture an image of the stained sample.

In conventional application scenarios, the antibodies are applied on the whole slide. In order to evaluate multiple different staining protocol parameters and respective protocols, multiple slides need to be stained separately.

In vMFP, the first antibodies are applied only locally, e.g. in the form of dots, on some regions of the image on a slide. Local application of antibodies ensures a reduced use of tissue, and allows for the testing of several conditions of the same tissue slide at the same time. According to preferred embodiments, the received image(s) comprise images which depict a tissue that was not contacted with the stain (e.g. the primary antibody). For example, if vMFP technique is used, these regions are automatically generated as the application of stain is confined to selected regions of a tissue only. These regions are used according to embodiments of the invention as a control of unspecific staining produced by the rest of components of the IHC assay.

For example, in case vMFP is applied, injection flow rates of antibodies with an MFP system are in the range of 0.1-20 μL/min to reduce antibody consumption. Lower flow rates reduce consumption of antibodies, while higher flow rates allow for a bigger footprint. A head that produces a hierarchical hydrodynamic flow confinement (HFC) is used, so that a second injection with a colored liquid can be applied for visualization of the confinement and reduction of antibody diffusion into the immersion liquid (PBS). This injection can be, however, obviated. The distance of the MFP head is preferably 20 to 200 μm from the tissue surface. The footprint size of the head, i.e. the area on a tissue sample that is contacted by the head and that receives the stain, will vary with the aperture size present in the head. Here, 300 μm diameter footprints were obtained, to get enough statistical data from the tissue. Due to the small region stained, it is possible to generate several footprints with varying conditions on the same tissue. This allows for a direct comparison of conditions while keeping the rest of conditions constant. After assay is finished, the tissue is mounted in non-aqueous medium and images are taken using an upright microscope in bright field. Images are acquired at 40×, with an exposure of 24 ms with 6 V. 9 images are taken per footprint. Before processing, the images are stitched together.

Definitions for "good" and "bad" images already exist in the art, e.g. in the "NordiQC table":

| | |
|---|---|
| Optimal staining | The staining is considered perfect or close to perfect in all of the included tissues |
| Good staining | The staining is considered fully acceptable in all of the included tissues. However, the protocol may be optimized to ensure the best staining intensity and signal-to-noise ratio |
| Borderline staining | The staining is considered insufficient, e.g., because of a generally too weak staining or a false negative staining of one of the included tissues, or a false positive staining reaction. The protocol should be optimized |
| Poor staining | The staining is considered very insufficient e.g., because of false negative staining of several of the included tissues, or a marked false positive staining reaction. An optimization of the protocol is urgently needed |

According to embodiments, for creating and annotating the training image data set used e.g. for training the prediction logic, the NordiQC table labels were modified: the label 'good' was used for optimal, good and borderline images. Images of 'poor' quality were subdivided in 'understain' and 'overstain', depending on whether they gave a false negative or false positive, respectively. Thus, only the quality labels "good", "understain" and "overstain" were used for annotating stained IHC images, whereby the schema depicted in FIG. 3 was used. FIG. 3A depicts a matrix of 3×3 "footprints" (dots) onto which the vMFP head applied a staining solution with the primary antibody. False negative staining can be differentiated from "true negative" IHC images by taking into account information of multiple staining approaches on the same tissue sample using multiple different protocol parameter such as staining duration and stain concentration.

FIG. 3A depicts a tissue slide image of healthy tissue and FIG. 3B depicts tumor tissue that expresses a tumor marker. On each of the two tissue slides in 3a, 3b, gradients of different concentrations of a stain (rows 1-3) and/or different incubation times (columns t1-t3) are applied, whereby the vMFP technique is used and each dot corresponds to a respective application of a staining protocol that is based on a unique combination of staining parameter values. For example, the concentrations 1-3 may raise in downward direction and the staining time t may raise in the direction from left to right. The healthy tissue depicted in FIG. 3A only comprises some faint, unspecific staining signal for all these conditions. Thus, all tissue images depicting a respective "vMFP dot" or "vMFP sub-image" represent true negative tissue images. To the contrary, in case a tissue that is stained with different staining protocols generates one or more images with a faint, unspecific staining signal and at the same time, for some other parameter values, generates one or more strong, high-contrast tissue images, all the faint low contrast images of this tissue or tissue spot can safely be considered as false negative. For example, FIG. 3B depicts a tissue section with three (invisible) vMFP dots which correspond to false negative results. Thus, the result that can be derived from FIG. 3B is that a staining duration of t1 will result in a false negative (understained) tumor tissue image, that a staining concentration of C1 will result in a false negative tumor tissue and that at least at specific combinations of short duration and high concentration (t1 & C3) or of a low concentration and long staining duration (C1, t3), a weak but noticeable staining signal is achieved. According to embodiments, only false negative staining images produced by incorrect protocols (here: protocol P1 {C1&t1}, P2 {C1&t2}, P3 {C2&t1}, are taken into account and used in a set of training images as "false positive images". Thus, in the example depicted in FIG. 3B, the three image regions at the left upper part of the image respectively comprising one of the "invisible" dots would be used as training images having assigned a "false negative" flag, which corresponds to a "LOW STAINING QUALITY" label.

Figure 4:
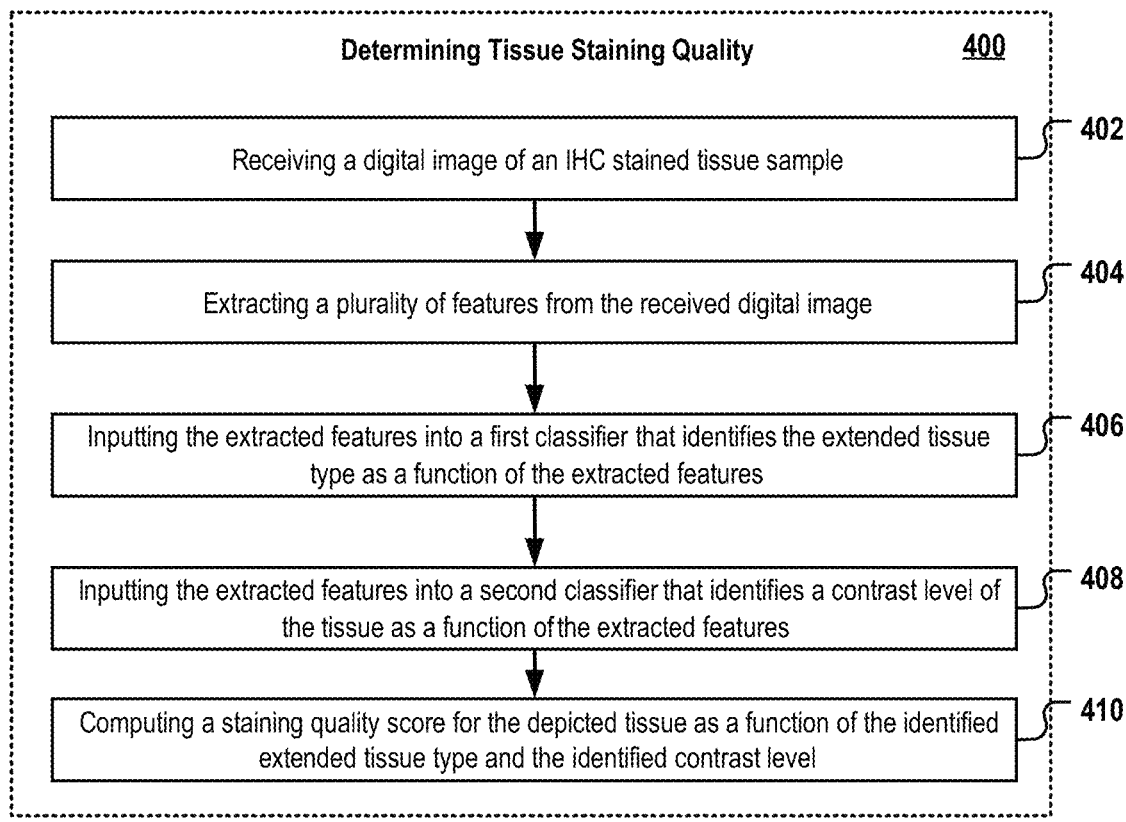
FIG. 4 depicts an image analysis method for assessing staining quality.
Figure 6:
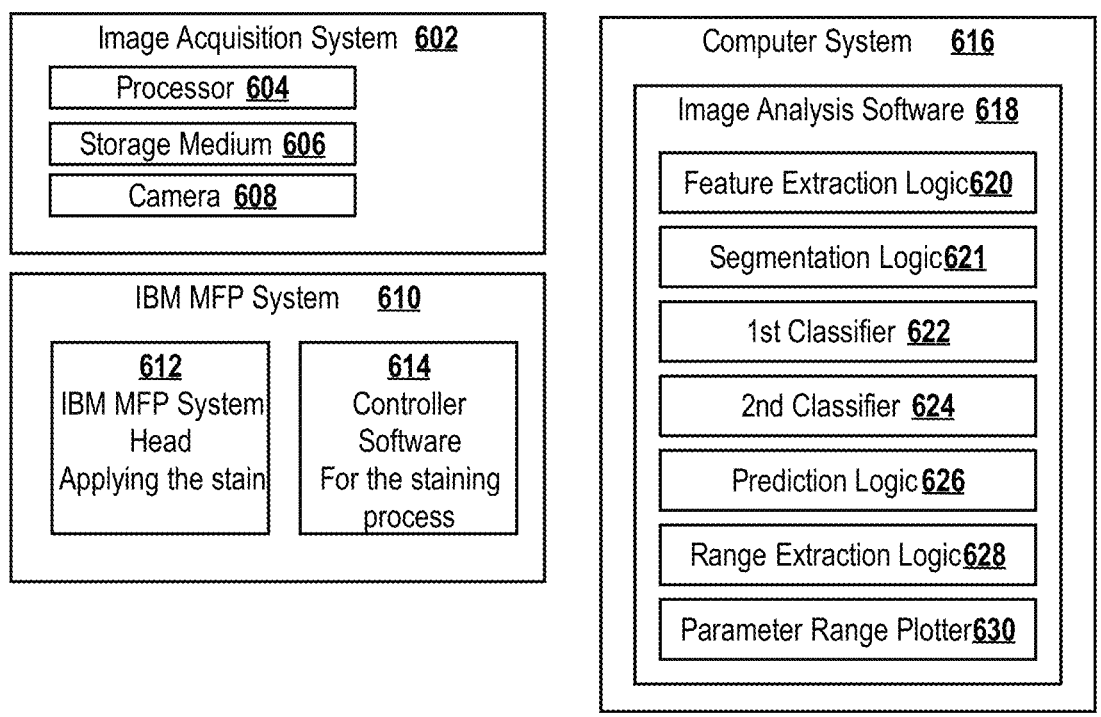
FIG. 6 depicts a block diagram of an image analysis system.

According to other embodiments, other staining parameters may be evaluated, e.g. the temperature or the concentration of the secondary antibody. The parameters leading to good staining quality are preferably determined by generating a matrix of vMFP dots on the same tissue sample of known origin (e.g. healthy tissue, primary tumor, metastasis), each dot corresponding to a unique combination of staining protocol parameter values. The information contained in the plurality of vMFP dots/staining parameter value combinations FIG. 4 depicts an image analysis method 400 for assessing staining quality. For example, the method can be performed by an image analysis system as depicted in FIG. 6. In a first step 402, a digital image of an IHC stained tissue sample is received by an image analysis system 616. For example, the image can be received directly from an image acquisition system 602 operatively coupled to the image acquisition system 616. Alternatively, the image can be read from a storage medium are received via a network from a server. In step 404, the image analysis system extracts a plurality of local and/or global features from the received image. Some first one or all of the extracted features are used as input of the first classifier. The first classifier in step 406 evaluates the input features and identifies the extended tissue type to which the tissue depicted in the received image most likely belongs to. For example, the first classifier may compute the membership likelihood of the depicted tissue for each of the predefined extended tissue types as a function of the extracted features. In addition, in step 408, a second classifier evaluates second ones or all of the extracted features and identifies a contrast level of the tissue depicted in the received image of the function of the extracted features. For example, the second classifier can compute the membership likelihood of the depicted tissue for each of a predefined set of contrast levels, e.g. "high contrast" or "low contrast". The first and second classifier can operate independent of each other. For example, in a multicore environment, the first and second classifier can operate concurrently. In step 410, a prediction logic 626 evaluates the output generated by the first and second classifier and computes a staining quality score for the depicted tissue or for a particular region of the depicted tissue as a function of the extended tissue type and contrast level likelihoods identified in steps 406 and 408.

Figure 5:
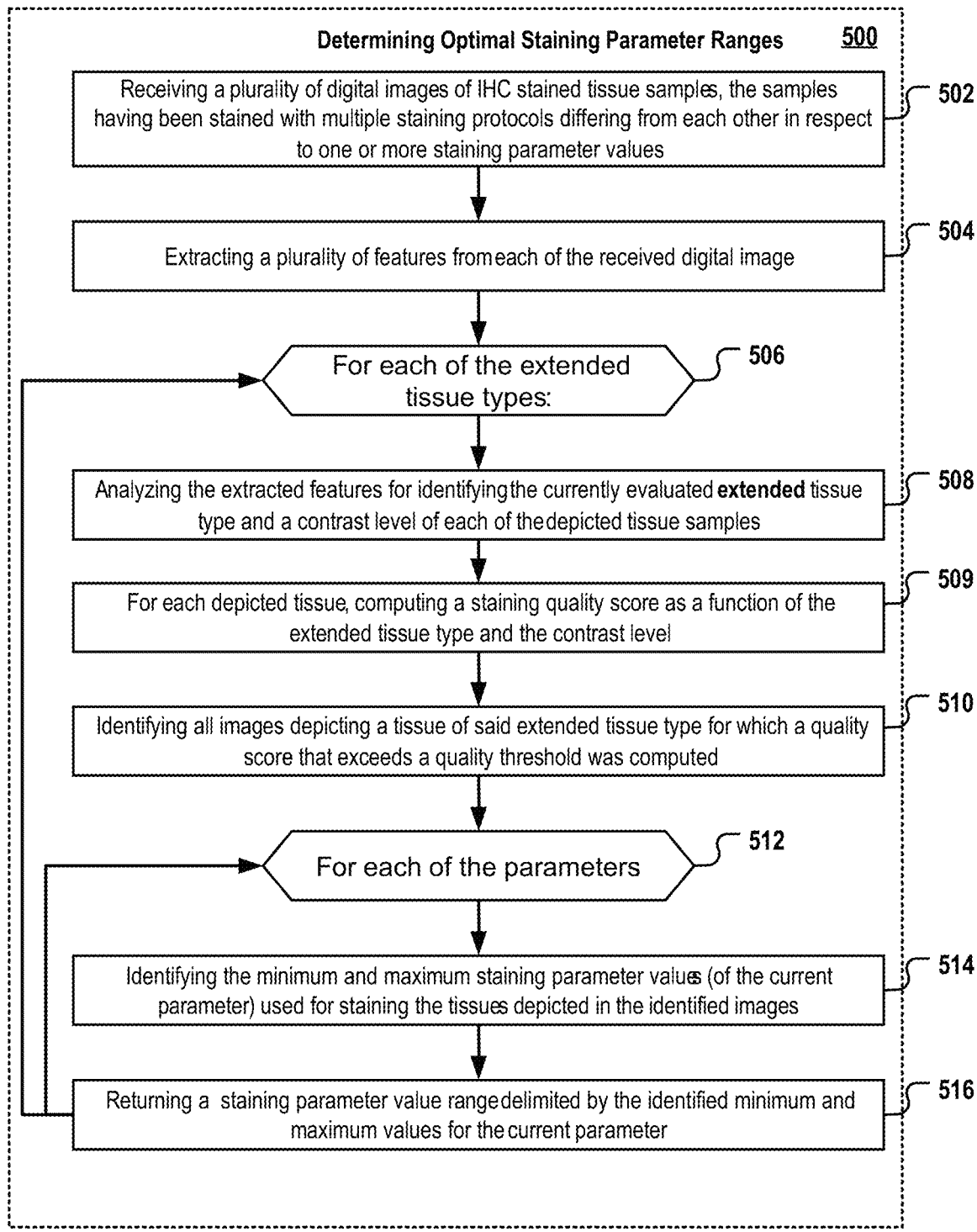
FIG. 5 depicts an image analysis method for assessing optimal staining parameter value ranges.

FIG. 5 depicts an image analysis method 50 for assessing optimal staining parameter value ranges. For example, the method can be performed by an image analysis system as depicted in FIG. 6. In a first step 502, the image analysis system receives a plurality of digital images of IHC stained tissue samples. For example, the received images may depict tissue samples of different tissue types such as "healthy tissue", "primary tumor tissue" and "metastatic tissue". In case the method 500 is performed for identifying suitable staining parameter value ranges for a particular combination of stain and tumor marker and for a particular set of extended tissue types, the received digital images may be derived from many different patients. Alternatively, the method 500 can be performed specifically for an individual patient for identifying optimal staining parameter value ranges for that individual patient. In this case, the digital images received in step 502 are derived from different tissue regions of this patient, whereby the tissue samples derived from this patient have been stained in accordance with many different staining protocols whose parameter value combinations are preferably all within the parameter ranges having been identified in the past by applying the method 501 a plurality of IHC images derived from many different patients. Preferably, the received digital images are image-subregions respectively depicting a single dot generated by a vMFP system. In step 504, the image analysis system extracts the plurality of local and/or global features from each of the received digital images. Then, in steps 508 and 509, the image analysis system uses the features for identifying, for each of the extended tissue types, the probability that the depicted tissue belongs to the currently examined extended tissue type, the probability that the depicted tissue belongs to a particular contrast level and a staining quality score is a function of the computed membership likelihoods. For example, steps 508 and 509 performed on an individual digital image can be implemented in accordance with the method 400 depicted in FIG. 4. In step 510, the image analysis system identifies all images which depicted tissue of the currently examined extended tissue type, for which a quality score that exceeds a quality threshold was computed. For example, a quality score threshold could be at 60% probability that a particular tissue is a "high staining quality" tissue. In some other embodiments in which the prediction logic merely outputs a binary class label ("high quality" or "low quality" image) for a given image, the quality score threshold can be implemented such that an image having assigned the "high-quality" label is considered to exceed the quality threshold of step 510.

In a further loop 512, for each of a plurality of predefined staining parameters, e.g. stain concentration or staining duration, in step 514 the minimum and maximum staining parameter value which have been used for staining the tissues of the currently evaluated extended tissue type depicted in any of the identified images are identified. In step 516, a staining parameter value range for the currently examined staining parameter is returned. The parameter value ranges delimited by the minimum and maximum values having been identified in step 514 for the currently examined parameter. The loops 512 and 506 are repeated until all defined extended tissue types and staining parameter have been evaluated.

FIG. 6 depicts a block diagram of an image analysis system. An image analysis system 616 is provided, e.g. in the form of a standard computer system on a server computer system. The system comprises an image analysis software 618. For example, the software 618 can be shipped together with an image acquisition system 602, e.g. a slide scanner or a microscope. The software comprises a plurality of modules and respective functionalities. For example, the image analysis software can comprise a feature extraction logic 620 adapted to extract local and/or global features from received images of stained tissue samples. The software can further comprise a segmentation logic 621 configured to segment images or parts of images depicting n vMFP dot into segments as depicted, for example, in FIG. 10. The segments can be used as basis for feature extraction performed by program logic 620. The image analysis software 618 can further comprise a first classifier 622 configured to analyze the extracted features of an image for predicting to which one of a plurality of predefined extended tissue types of particular tissue or tissue section depicted in the received image belongs to. It can further comprise a second classifier 624 which is configured to analyze the extracted features for classifying the received image into one of a set of predefined contrast levels, e.g. "high contrast image" or "low contrast image". The combined output of the first and second classifier 622 and 624 is used by a prediction logic 626 for predicting the staining quality of an image or image region. The predicted staining quality can be used by a range extraction logic 628 for automatically identifying staining parameter value ranges which are particular for the respective extended tissue types and which can safely be assumed to yield high quality staining. The resides computed by the range extraction logic 628 can be visualized and displayed to a user via a screen by a parameter range plotter 638.

Figure 8:
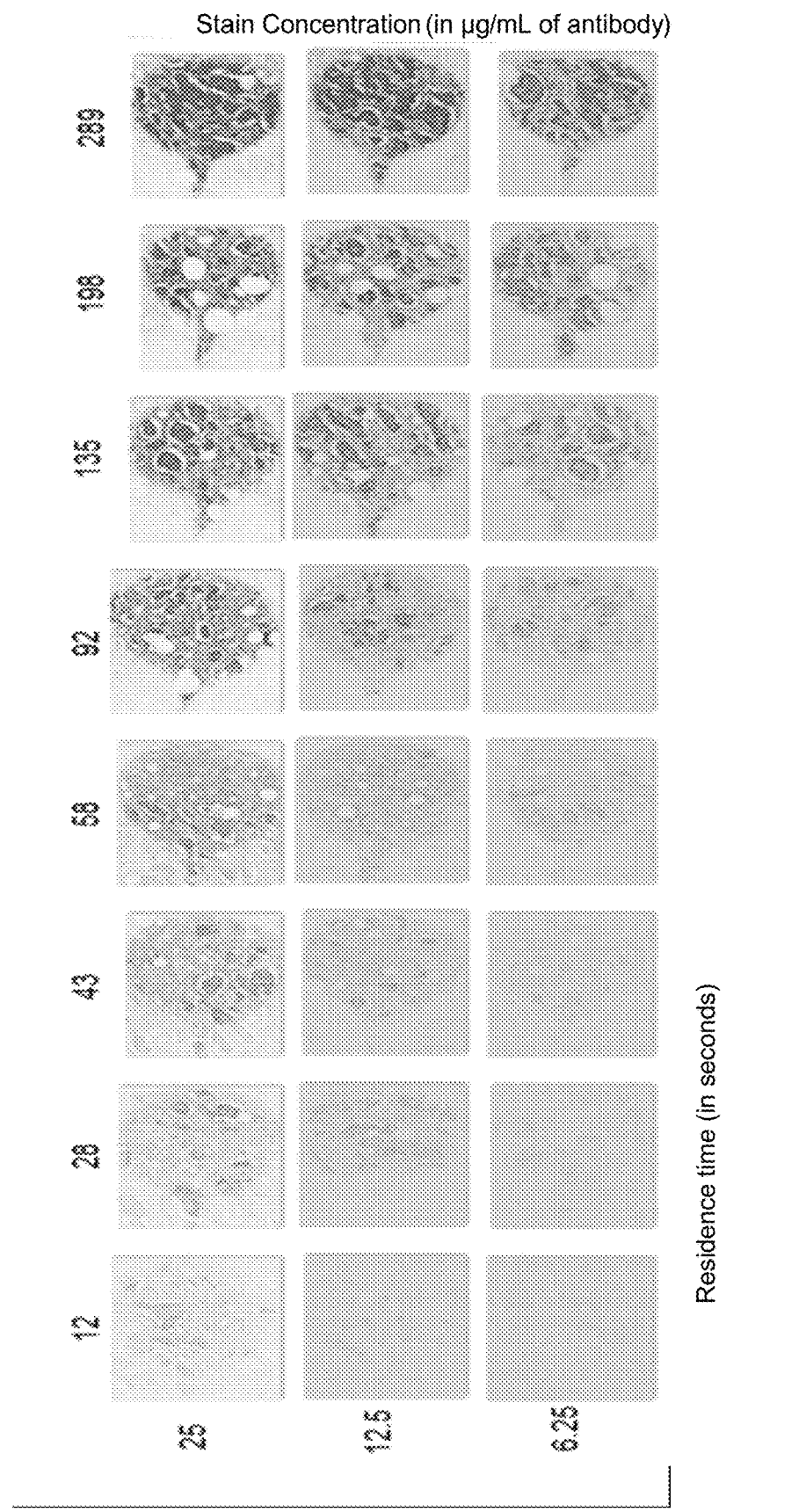
FIG. 8 depicts sample images of a tissue stained in accordance with two series of varying process parameter values.

According to some embodiments, the image analysis system 616 is operatively coupled to an image acquisition system 602. The image acquisition system can comprise a processor 604, a storage medium 606 for temporarily or permanently storing images which are captured by a camera 608. In preferred embodiments, the image acquisition system is coupled to a vMFP system 610, e.g. the vMFP system developed by IBM. The MFP system 610 comprises a heads configured to apply µl of the staining solution, e.g. a primary antibody solution, to selected dots, stripes or other confined sub-regions of a tissue sample on a slide. Thereby, the position of the tissue dots onto which the staining solution is applied by the head 612 and/or the unique combinations of staining parameter values such as stain concentration are controlled by a controller 614 of the system 610. According to preferred embodiments the controller 614 is configured for generating a matrix of dots, whereby each dot corresponds to a small volume of staining solution that is applied in accordance with a unique staining protocol, whereby a unique staining protocol corresponds to a unique combination of two or more staining parameter values such as staining duration, stain concentration or the like. An example of such a matrix (for normal tissue slides) is depicted in FIG. 8.

Figure 7:
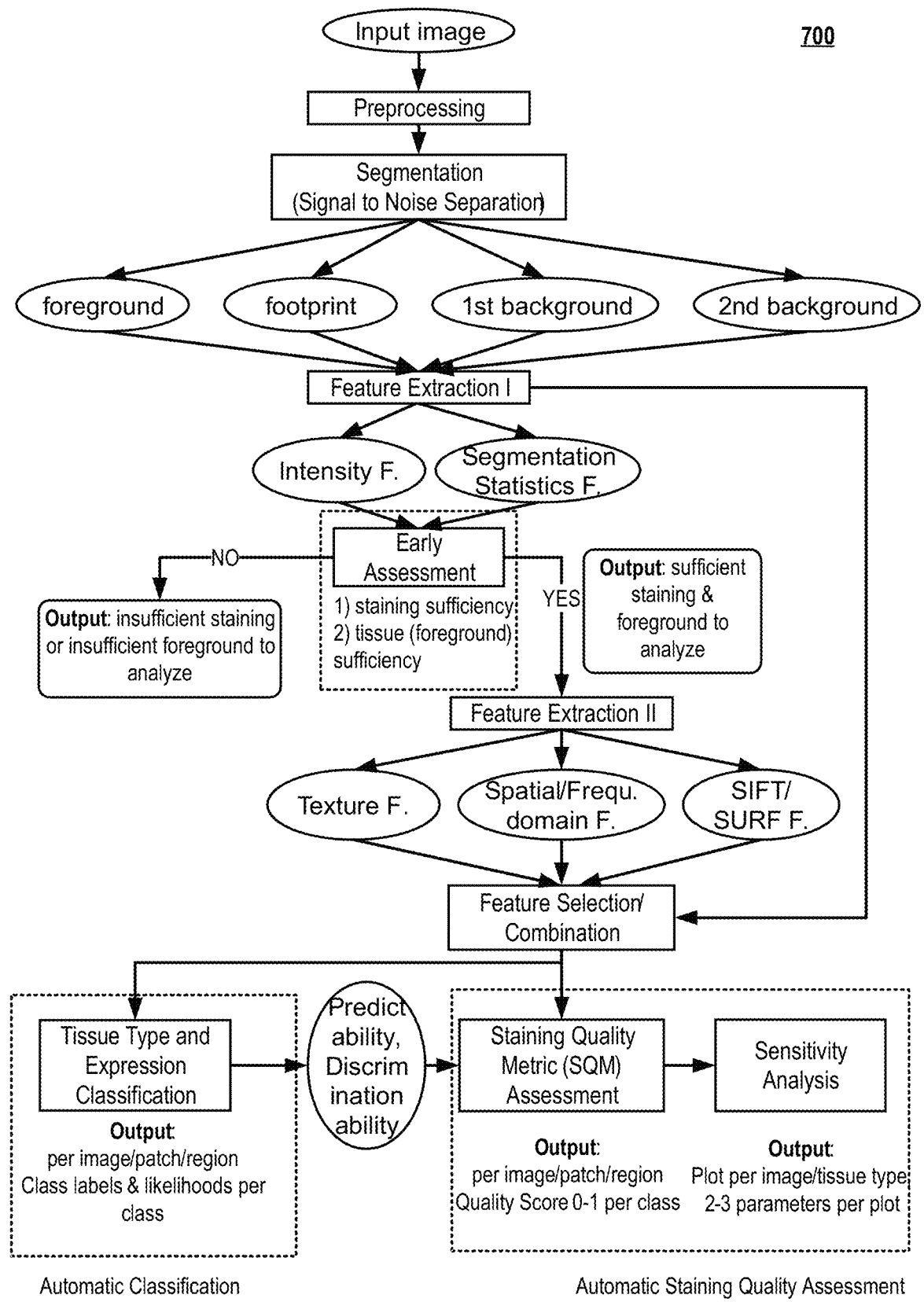
FIG. 7 depicts an image analysis workflow.

FIG. 7 depicts an image analysis workflow 700 performed by an image analysis system according to an embodiment of the invention.

Figure 9:
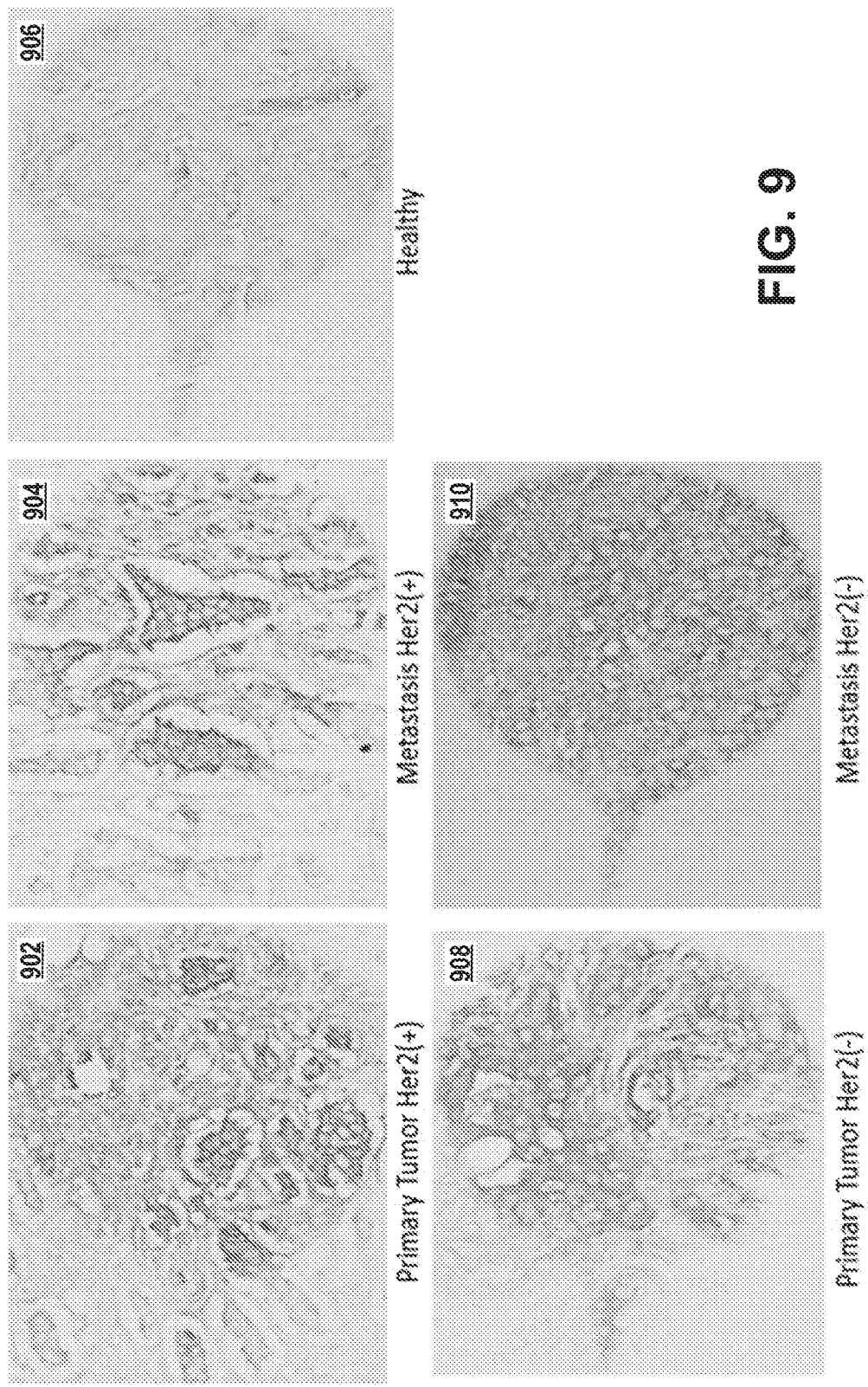
FIG. 9 depicts example images of five extended tissue types.

PREPROCESSING: At first, a digital image of an IHC stained tissue is received. For example, the typical size of a digital image is 2000×1600 pixels in which an average tissue cell has a size of 60×60 pixels. For example, the received image can be an image of a breast cancer tissue having been stained using IBM's vMFP system. Her2 antibody is used for the IHC staining, and the process parameters to analyze are staining duration (also referred to as "residence time"—RT) and stain concentration (also referred to as "antibody dilution"—C). FIG. 8 shows sample images from a dataset comprising images of tissues having been stained with unique combination of staining parameter values, and FIG. 9 shows example images of all extended tissue types (tissue types which are sub-classified in accordance with the expression state of a tumor marker). The received digital image is one of said image data set, and the workflow is performed for each of the images of the dataset. In the following, the workflow will be described for a single image only.

The received digital image is preprocessed using image analysis techniques. The preprocessing mainly includes conversion of image type and color and simple artifact elimination prior to the subsequent segmentation step.

Figure 10:
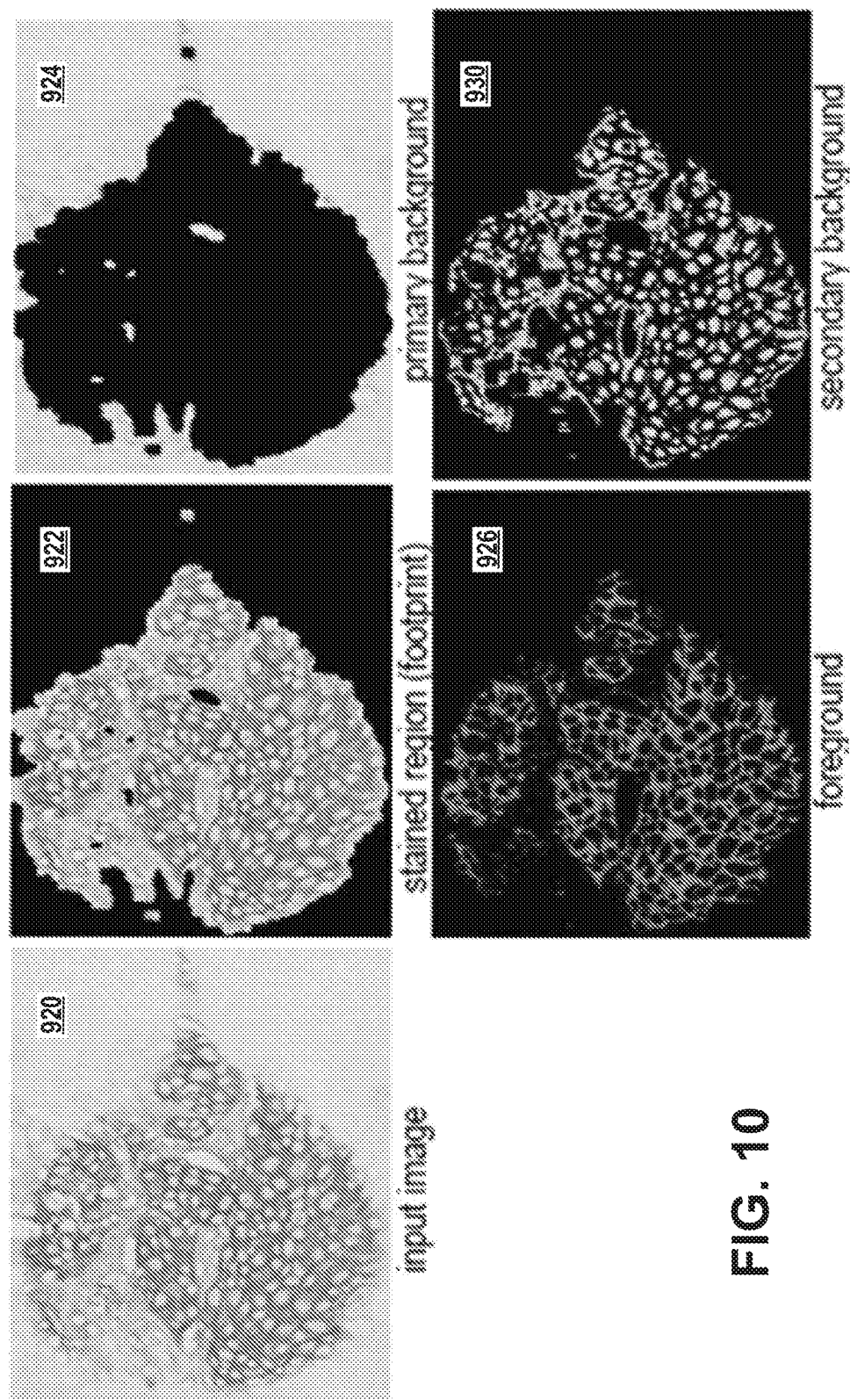
FIG. 10 depicts image segments resulting from a segmentation process.

SEGMENTATION: Then, a segmentation operation is performed on the preprocessed image in order to obtain segments based on a signal-to-noise separation. In the case of breast cancer, tumor marker Her2 is expected to be overexpressed in the cell membrane in tumorous cells. As the primary antibody selectively binds to the tumor marker, only the cell membranes of breast cancer itself should be stained if the staining protocol parameter values are chosen correctly. All the remaining cell structures (cytoplasm and nucleus) should remain unstained. The segmentation procedure that is applied is adapted to separate image regions which depict different types of regions of a tissue sample. The segmentation procedure extracts four regions from a given tissue image such as 1) foreground (signal, true positive), 2) primary background (true negative), 3) secondary background (noise, false positive) and 4) stained region (footprint) as shown in FIG. 10. Preferably, the segmentation procedure comprises applying a watershed-based segmentation in combination with several image processing algorithms (i.e., image blurring, Otsu thresholding, morphological operations). The segmentation procedure can be alternated or modified to achieve improved segmentation or optimal segmentation in application to different staining, tissue or image types.

Figure 11:
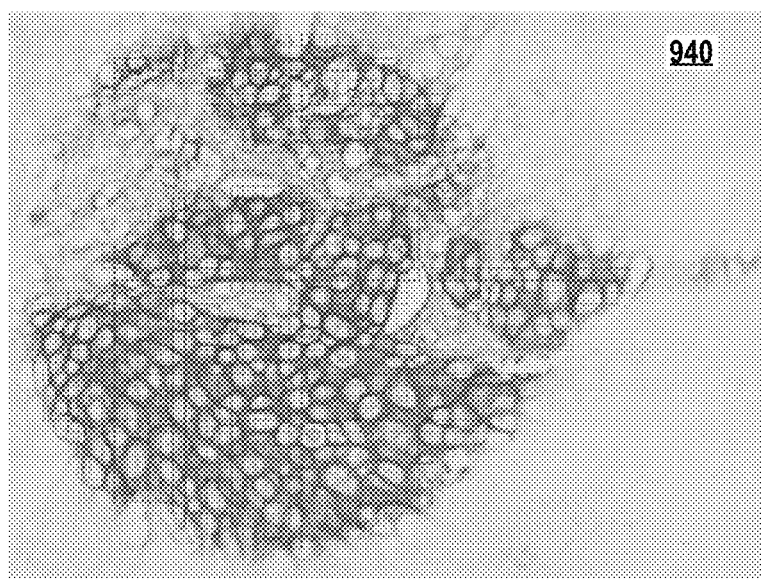
FIG. 11 depicts patches used for local feature extraction.

In the next step, a first feature extraction operation is performed. The step comprises extracting features of many different types in order to obtain a rich representation of the information contained in the received digital image that allows higher separability regarding the tissue type and expression classification and that enables efficient encoding of the staining quality. For example, the following types of features can be extracted in the first feature extraction operation:

Intensity features (extracted on segmented regions absolutely and relatively)
  Mean intensity of the foreground
  Mean intensity of the secondary background
  Mean intensity of the stained region (footprint)
  Relative intensity: of the mean intensity of the foreground to the mean intensity of the secondary background ("baseline feature")
Segmentation statistics (extracted on segmented regions)
  % of foreground within the whole image
  % of foreground within the footprint
  % of footprint within the whole image
Texture features (extracted on local patches within foreground). For example, texture and spatial/frequency-based features are extracted on overlapping patches of size around 60×60 pixels (average cell size) as shown in FIG. 11. Texture features are selected from a group comprising:
  GLCM-based features: contrast, entropy
  Image gradient-based features: mean and standard dev. gradient magnitude, Tenengrad response, sharpness and blurriness
Spatial/frequency domain features (extracted on local patches within foreground)
  Gabor wavelet transform
  Discrete wavelet transform (DWT)
  Dual-tree complex wavelet transform (DTCWT)
  SIFT/SURF features (extracted around keypoints detected within foreground)

Optionally, the workflow may comprise additional steps for checking if the image comprises a staining signal that is high enough/sufficient to be considered at all and/or for checking if the tissue section depicted in the image is large enough for further analysis. If not, the workflow may be stopped already at this point to save computational resources. In some embodiments, a warning message can be displayed to a user for enabling the user to decide whether or not the image should further be processed. Preferably, the extraction of the texture features, spatial/frequency domain features and the SIFT/SURF features are only performed in a second feature extraction step if the checking procedures determined that the staining signal is sufficiently strong and the tissue size is sufficiently large for further feature extraction and image analysis.

The described checks are depicted as the box "early assessment". The early assessment may be advantageous as the second feature extraction step is typically computationally more demanding than the first feature extraction step and may be avoided in case staining intensity insufficiency and/or tissue insufficiency is observed. The second feature extraction and the first and/or second classifier are only performed in case the early assessment determines that the received image comprises sufficient staining intensity and depicts a tissue larger than a minimum size.

For example, the determination of staining intensity insufficiency for an image can comprise extracting and analyzing indicators of insufficient staining. These indicators comprise:
  Intensity difference between the stained region and primary background is very low or lower than a user defined threshold i.e., <20 using an intensity scale of 0-255
  Percentage of segmented region within the whole image is very low or lower than a predetermined threshold i.e., <10%
  Percentage of foreground region within the whole image is very low or lower than a predetermined threshold i.e., <3-5%

For example, the determination of tissue insufficiency can comprise analyzing the amount of region of interest (i.e., epithelial cells over expressing the protein of interest (Her2)) within the stained region using the segmentation statistics. For example, the percentages of the true positive staining (represented as foreground pixels) within the stained region ("footprint") is considered to be directly proportional with the sufficiency of interesting tissue material in each sample such that a very low percentage (e.g. 5%) implies a bad tissue sample with insufficient tissue material. A predetermined threshold, which determines the minimum acceptable tissue size and/or quality, can be used to determine whether the remaining modules will be performed for the given sample.

In the next step, a selection and/or a combination of features is performed to discard irrelevant and very highly correlated features from the whole feature set (except SIFT/SURF features) as well as to reduce the dimensionality. For example, random forests may be used as feature selection algorithm, whereby the random forests are configured to reduce the dimensionality of the totality of around 500 extracted image features to less than 50 features.

According to embodiments, SIFT/SURF features are utilized especially for the discrimination of tissue types and expressions (i.e., for the discrimination of extended tissue types) as they capture tissue and expression morphologies. As the number of keypoints can vary in each image, obtaining a fix dimensional feature vector is not straightforward with SIFT in contrary to all other features. In this respect, a bag of visual words model is applied for SIFT and/or SURF features for representing each image with a histogram having a fixed bin number over the feature vocabulary.

After having extracted global and local features from the received image in the above described feature extraction steps, and after having created a consolidated feature set by feature selection in combination, the consolidated feature set is fed into a first classifier configured to automatically identify the extended tissue type of the tissue sample depicted in the received digital image as a function of the extracted, consolidated features. According to embodiments, the identification of an extended tissue type comprises:

Tissue type classification i.e., healthy, primary tumor, metastasis.

Tumor marker (protein) expression classification i.e., Her2(−), Her2(+)

Both classification tasks can be performed by a first trained classifier having been trained in a supervised manner on a set of training images having been annotated with ground-truth labels for tissue type and tumor marker expression status. Preferably, these two classification tasks are combined into a single 5 class classification task, whereby each possible combination of tissue type and expression status is represented as a respective "extended tissue type", e.g. primary tumor (+), primary tumor (−), metastasis (+), metastasis (−) and healthy tissue. Any supervised classifier can be trained for the "extended tissue type classification task" such as from simple naïve Bayes classifiers to more sophisticated support vector machines (SVM), decision trees and especially convolutional neural networks (CNNs) if the data amount is sufficiently large. In case the available training data is of limited size, multi-class SVMs are preferably used as the first classifier. The first trained classifier is configured to perform both class predictions and compute individual likelihoods of a sample belonging to each of the five extended tissue types. An image depicting a "tissue sample" can be, for example, a sub-region of an image, e.g. a single patch extracted from the foreground or from the whole image.

Figure 12:
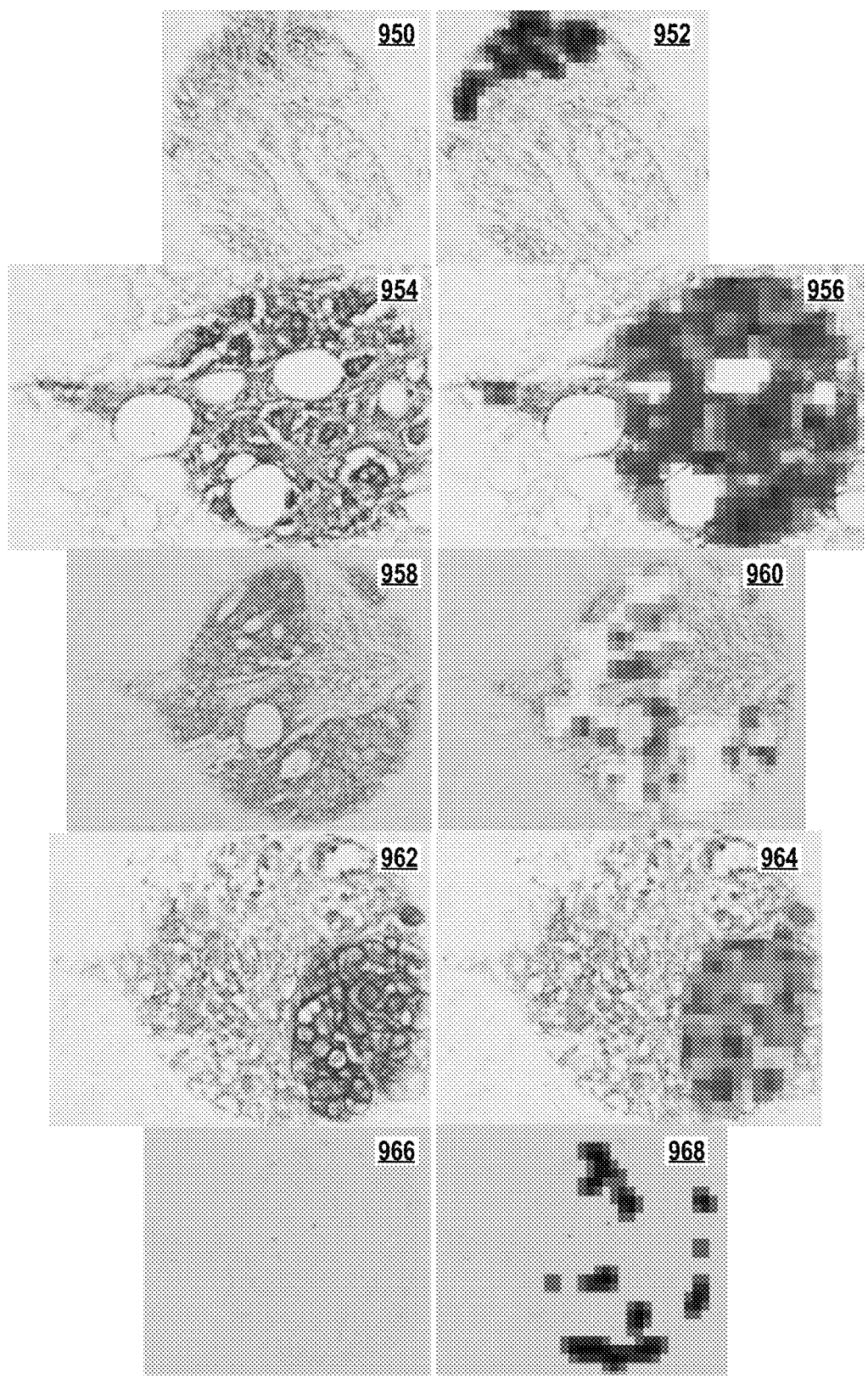
FIG. 12 depicts example outputs generated patch-wise by a first classifier.

In some embodiments, the results of the tissue type and expression classification performed by the first classifier is output in the form of a plot, e.g. a heat map indicating the likelihoods of an image patch of depicting a particular one of the extended tissue types. Alternatively, all patches (sub-regions) of the received image or of the foreground of the received image can be overlaid with a color that represents the one of the extended tissue types that was identified by the first classifier as the most likely extended tissue type of the tissue depicted in said image patch. FIG. 12 shows examples for a "patch-wise, extended-tissue-type-based labeling".

Figures 13, 14:
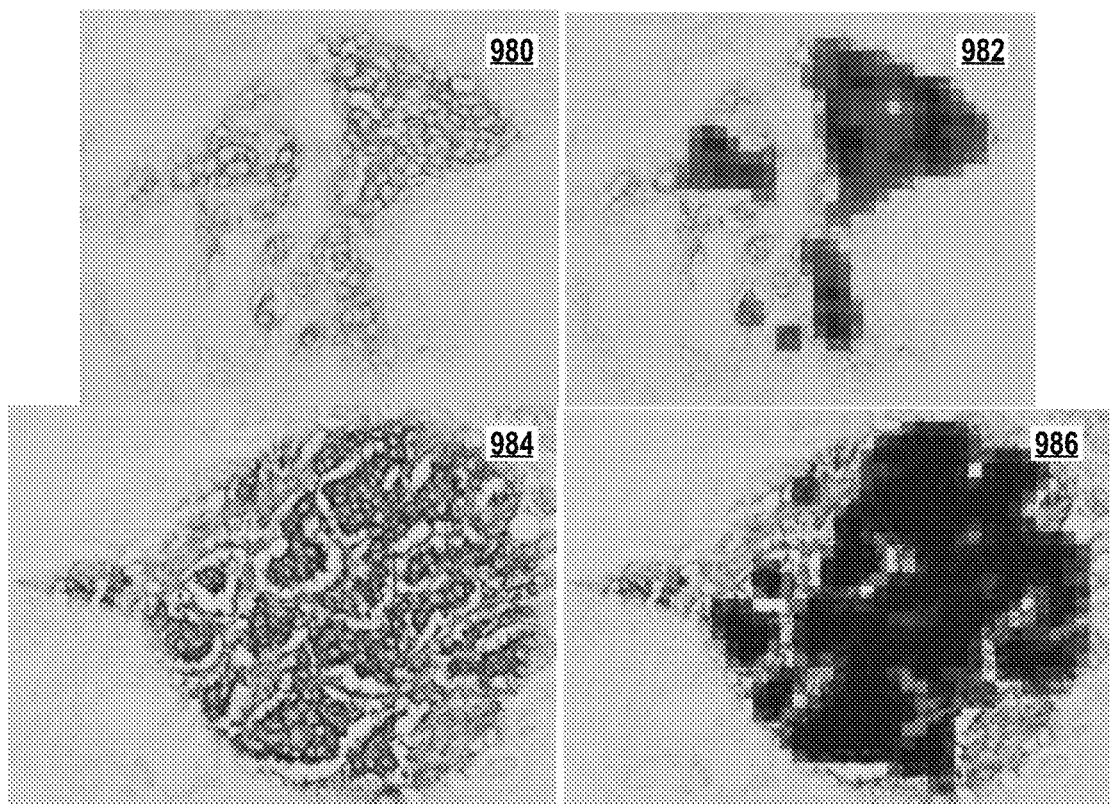
FIG. 13 depicts a confusion matrix of predictions of extended tissue types.
FIG. 14 depicts example outputs of contrast level classification using patch-based color assignment.

Once the most likely extended tissue type is determined for each image patch by the first classifier, the most likely extended tissue type of the whole depicted tissue is computed. The most likely extended tissue type of the tissue depicted in the received image is computed by performing a majority voting operation. The majority voting comprises determining the one of the extended tissue types that is the most likely extended tissue type of the majority of image patches. The table in FIG. 13 illustrates the classification performance of the first classifier having been trained with different feature sets on a training data set with annotated training images.

In addition, the consolidated feature set extracted from the received image is fed into a second classifier configured to automatically identify one of a predefined set of contrast level the tissue sample depicted in the received digital image belongs to. The second classifier identifies the contrast level as a function of the extracted, consolidated features.

For example, the second classifier is generated by training a machine learning logic on training images which were annotated with true contrast levels, e.g. "HIGH CONTRAST" or "LOW CONTRAST". The training of the second classifier on annotated contrast levels is preferably performed independent of the training of the first classifier on annotated extended tissue types. An example of a confusion matrix that describes the classification results generated by a second classifier is given below.

| | Predicted Class: High Contrast Level | Predicted Class: Low Contrast Level |
|---|---|---|
| Actual Class: High Contrast Level | 64 (TP) | 6 (FN) |
| Actual Class: Low Contrast Level | 4 (FP) | 66 (TN) |

Overall accuracy: 92.85%

After the first classifier has predicted, for each image patch, the most likely extended tissue type and after the second classifier has predicted, for each image patch, the most likely contrast level, the staining quality is assessed ("Staining Quality Metric—SQM Assessment").

For example, the SQM can be computed by a prediction logic 626 depicted in FIG. 6, the SQM being computed as a function of the output generated by the first and second classifier.

For example, the prediction logic can be generated by training a machine-learning algorithm using linear or non-linear regression analysis. Thereby, a model of the staining quality of an image or image patch in dependence on extended tissue type and contrast level is learned and represented in a regression model. Once the regression model is learned from the training data, it predicts a staining quality score having a value range between 0 and 1 for a given image or image region. Preferably, one regression model is learnt per extended tissue type by the prediction logic for the staining quality assessment.

The prediction logic 626 can be automatically generated based on the informativeness of features extracted from a digital image in respect to tissue type and contrast level. For example, the first classifier (tissue type classifier) can compute a first probability map for the image, whereby the first probability map indicates, for each sub-region ("patch") of the image, the probability that the sub-region depicts a section of a tissue belonging to one of the five extended tissue types. The second classifier (contrast level classifier) can compute a second probability map for the image, whereby the second probability map indicates, for each sub-region of the image, the probability that the sub-region belongs to a particular one of e.g. two predefined contrast levels. Thus, the totality of (in this case: seven) probabilities computed in respect to the extended tissue types and contrast levels for each sub-region of the image can be used as input for training the prediction logic. The purpose of the training is to obtain a prediction logic that is adapted to accurately assess the staining quality (represented e.g. a s "staining quality metrics—SQM" or "staining quality score"). It has been observed that the assessment of the contrast level of an image region in combination with information on the depicted extended tissue type allows for a particularly accurate assessment of the staining quality.

Depending on the availability of training images with annotated staining quality scores, different approaches for generating the prediction logic can be performed:

In case many training images with annotated numerical staining quality scores (e.g. a value between 0 and 1) or categorical staining quality labels (e.g. "high quality staining" or "low quality staining") are provided by pathologists, the prediction logic is generated by training a regressor or a classifier in a supervised manner, e.g. by using support vector regression, least-squares regression or a CNN-based regression directly on the training images. For example, an image may be annotated as a "high staining quality image" or with a high staining quality score if it contains sufficient information to discriminate all tissue types, including the tissue types having different tumor marker expression status, from each other, and if its signal-to-noise ratio, i.e., its "contrast level", aligns with the expected contrast level for that specific tissue type and expression level predicted for the tissue based on image features.

In case the training images are annotated with numerical staining quality scores, a regressor-based approach for generating the prediction logic can be used. In this case, the trained predictor can be used for predicting, by the regression model of the predictor, a quality score for a test image, which is plotted to obtain a quality score map of the test image.

In case training images are available which are annotated with (categorical) staining quality labels (e.g. "High/Low") and for which no quality scores are available, an untrained version of a classifier can be trained on the annotated training images in order to obtain the prediction logic. In this case, the trained classifier is configured to compute the probability of a test image to belong to the "High quality" staining class and use this probability as the numerical staining quality score. For example, if an image (or image patch) has high probability to belong to "High Quality" class, then the quality score is high for that image.

According to one example, the generation of the prediction logic comprises training the first classifier on stained tissue images generated based on many different staining parameter value combinations such that the trained first classifier is adapted to compute extended tissue type membership likelihoods; training a second classifier on stained tissue images generated based on many different staining parameter value combinations such that the trained second classifier is adapted to classify images or image patches into different contrast levels; applying the first and second classifier on a plurality of further tissue images, thereby generating a probability map for each of the further tissue images, for each of the extended tissue types and for each of the contrast levels defined. The probability maps obtained from these classifiers are then fed into a regression algorithm e.g. a support vector regression algorithm, a least-squares regression algorithm or a CNN-based regression algorithm. The regression algorithm is then trained in a supervised manner. The training comprises estimating the staining quality of an image by the regressor such that the quality resulted from a certain staining parameter value combination used for generating the further image is correlated with the parameter value combination's discrimination ability in classifying tissue types and expressions and signal-to-noise contrast level. Thereby, extended tissue type specific regressor models are generated in a supervised training process. The staining quality estimates of new tissue images can be directly obtained from the trained regressor and the trained regressor is used as the prediction logic 626.

The above described approach requires a sufficiently large number of adequately annotated training images which should cover the entire parametric space of the staining parameters of interest to capture the variation of staining quality with respect to said parameters.

In case a sufficient number of training images with annotated staining quality scores or staining quality labels is not available, an alternative approach for generating the prediction logic which is based on unsupervised learning can be applied.

According to one embodiment, unsupervised naïve Bayes classification using Gaussian mixture models (GMM) with expectation and maximization (EM) is used for automatically predicting the staining quality of an image. The approach comprises using the first and second classifier for computing an extended tissue type probability map and a contrast level probability map for each training image as described above. These two probability maps (extended tissue type and contrast level membership) which have been computed for the training images depicting a particular extended tissue type are fitted into two clusters using GMM. The training image set is chosen such that it can safely be assumed that the training images consists of High and Low staining quality images (which are not annotated, however). The "high quality staining" training images are grouped by the GMM clustering into one cluster and the "low quality staining" images are grouped into another. The GMM clustering is based on the first and second probability maps computed by the first and second classifiers.

According to embodiments, the training of the naïve Bayes classifier comprises fitting a Gaussian mixture model into the training images and inferring, by the expectation and maximization (EM) algorithm of the naïve Bayes classifier, the extended tissue type and contrast level class membership distributions. As the data contains good and bad quality samples, a Gaussian mixture model (GMM) with two Gaussians can be fitted into the training images. Once the fitted GMM is obtained, the quality scores are calculated by computing the likelihood of a sample belonging to each of the two predefined staining quality classes "HIGH STAINING QUALITY" or "LOW STAINING QUALITY".

As it is an unsupervised method, it is prima facie not clear which one of the two clusters comprises the high quality images. However, this distinction can easily be made manually by inspecting a small set of images obtained by the clustering process. Thereby, the one of the two clusters comprising the "high staining quality images" is identified. The clustering process comprising computing the likelihood of each training image to belong to one of the two clusters. Alternatively, a few manually annotated test images can be tested in the trained cluster logic in order to determine the cluster with high quality images, which will accommodate more high quality annotated images.

As a result of the unsupervised training approach described above, a trained cluster logic is provided that is configured to compute, when clustering a set of images, the likelihood of each of said images to belong to the "high quality image cluster". This likelihood is output by the trained cluster logic as the quality score predicted by the trained cluster logic when it is used as the prediction logic 626.

The above described unsupervised approach may have the advantage that it can be used for automatically generating the prediction logic 626 even in case no sufficiently annotated training image set is available.

Figure 15:
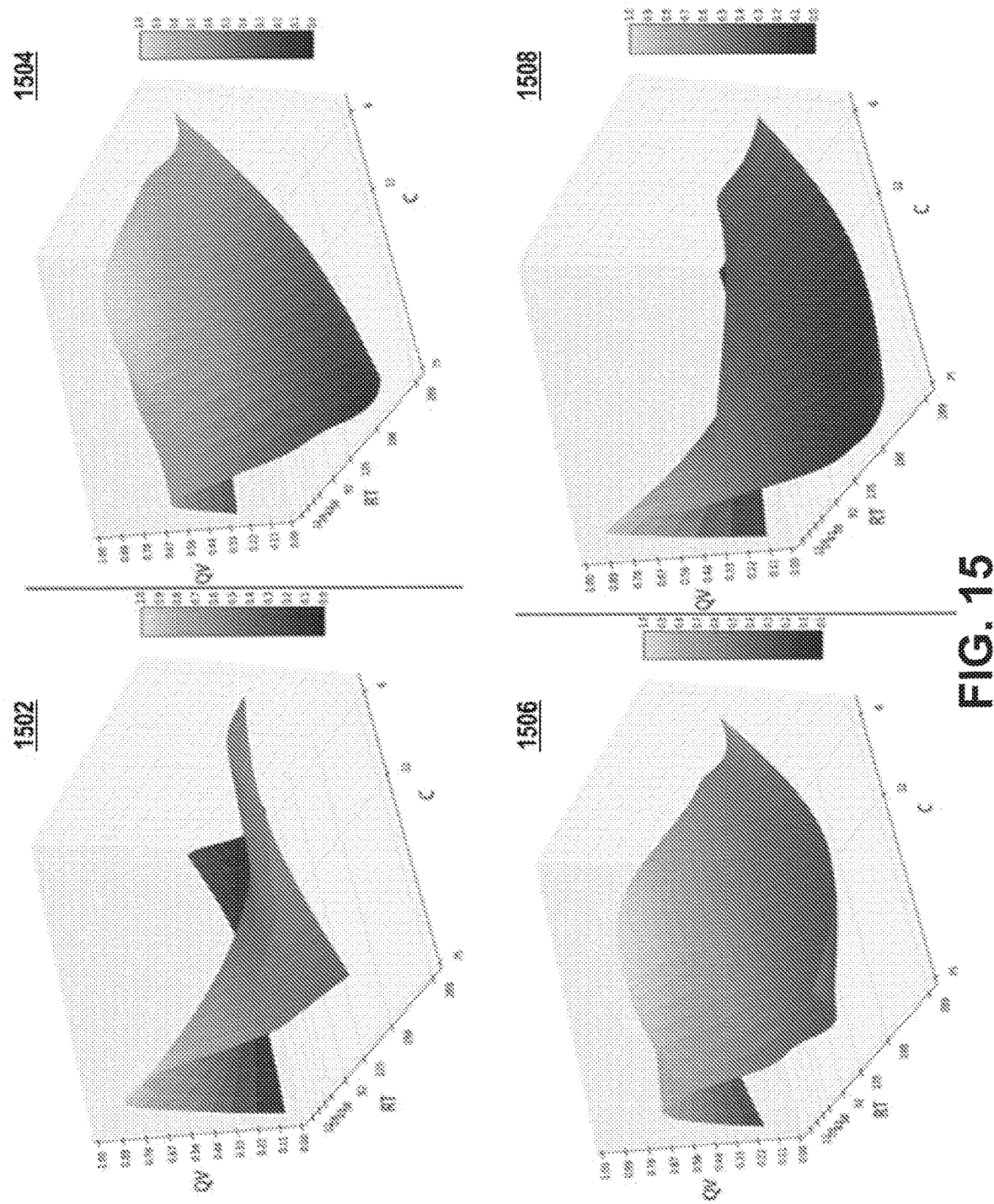
FIG. 15 depicts 3D plots representing Gaussian Polynomial fits on the data points of each extended tissue type.

Once the prediction logic that is adapted to compute a staining quality score for a given image or image patch is generated by one of the above described machine-learning approaches, staining quality scores of are computed for each of a plurality of received test tissue images. The obtained staining quality scores are projected into a 3D coordinate system whose axes represent the staining parameters whose values varied in the plurality of received test tissue images. For example, one axis could represent the stain concentration, another one the staining duration and a third one the staining quality score. According to some example implementations, a 3-D manifold is fitted over the entire space of stain concentration (C) and staining duration ("residence time"—RT). Then, triangulation of the input data (C, RT and Quality score) with Quickhull algorithm is performed and a piecewise cubic interpolating Bezier polynomial is constructed on each triangle, using a Clough-Tocher scheme supported in interpolating the data points at desired intermediate configurations. Obtained 3D surface representations are shown in FIG. 15.

On these manifolds, several statistics can be extracted to analyze the sensitivity of staining quality with respect to the analyzed process parameters and their ranges. According to some example implementations, the dependency of the quality score from the two examined staining parameters C and RT are graphically represented by transforming the 3D manifolds into a 2D heat map, thereby generating a heat maps ("parameter value sensitivity maps" or "sensitivity maps" in which a predefined color or brightness indicates a strong dependency of the staining quality from the value of a particular staining parameter. An example of such a heat map is given in FIG. 16.

According to some embodiments, a sensitivity score is computed for every possible combination of examined parameter values (every possible "configuration"), using variational computation techniques, as suggested e.g. in B. Seguin, H. Saab, M. Gabrani and V. Estellers. "Estimating pattern sensitivity to the printing process for varying dose/focus conditions for RET development in the sub-22 nm era," in Proc. SPIE 9050, Metrology, Inspection, and Process Control for Microlithography XXVIII, 90500P, 2014. Then, a "2D sensitivity contour map" or "sensitivity map" is plotted using the sensitivity scores with respect to the evaluated combination of parameter values (e.g. for "C" and "RT" values).

According to one embodiment, the 3D manifold ("3D sensitivity map") is used as follows for selecting, for a combination of staining parameters, suitable staining parameter value ranges as follows:

Select a point $p_i$ on the 3-D manifold, denoted by $p_i=(RT_i; C_i; QV_i)$. Select a set of neighbor points $n_i=[p_1, p_2, \ldots, p_i, \ldots, p_8]^T$, that includes 8-connected neighbors to the point $p_i$ and the point $p_i$ itself. Then, compute the difference vector, $v_i=[p_1-p_i, p_2-p_i, \ldots, 0, \ldots, p_8-p_i]T$, between $n_i$ and $p_i$. The difference vector indicates the change in the staining quality score "QV" in the neighboring C and RT parameter value combinations. Construct the covariance matrix $Cov_i$ for $v_i$, given by $Cov_i=v_iv_i^H$. In order to quantify the variation on the surface from the point $p_i$ towards different directions, perform an eigen decomposition on $Cov_i$. The maximum value among the resulting eigen values ($\lambda_S$), denoted by $\lambda_{max}=\max(\lambda)$, indicates the direction of maximum variation at $p_i$. Higher value of $\lambda_{max}$ at a point conveys high degree of variation, implying high sensitivity around the point. Higher sensitivity at a point on the 3-D manifold entails more instability in staining quality at the corresponding configuration of process parameters. Operating the staining process at such parameter configuration, makes the staining quality vulnerable to slight variation in the parameters setting. Therefore, a sensitivity contour plot is designed for each extended tissue type indicating the sensitivity of the staining quality score QV to all evaluated combinations of parameter values of C and RT. Then, the optimal range for the process parameter values are obtained as a function of a combination of the 3-D manifold, which indicates the parameter value range combinations where images with acceptable staining quality can be obtained, and the sensitivity contour map, which indicates the stability in image quality with respect to parameter configurations. For example, the parameter value range can be chosen such that an optimization of both the robustness against parameter value variation and staining quality is achieved. In some example embodiments, optimal staining parameter value combinations for the parameters C and RT are obtained by selecting a parameter value that has the maximum or close to the maximum quality score in the 3-D quality plot and that at the same time has a low or at least sub-maximal sensitivity score. The lower the sensitivity score at a particular staining parameter value combination, the higher the robustness of a staining protocol using said staining parameter value combination.

Combining the information contained in the 3D representation of the staining quality scores and the sensitivity map allows a human user to intuitively and quickly identify tissue type specific optimal staining parameter value ranges and optimal staining parameter value combinations that will result in high quality staining.

According to some embodiments, optimum staining parameter values are selected such that a combination of the selected staining parameter values corresponds to a staining quality peak in the 3D manifold representation as depicted, for example, in FIG. 15.

According to other embodiments, optimum staining parameter values are selected such that staining parameter values from a region in the 3D manifold plot that is close to the highest staining quality value that is less sensitive from a parameter than the region at the staining quality peak. Thus, in this case, a slight deterioration of staining quality is accepted in order to obtain staining parameter values which will not create staining results which are highly sensitive to small variations of this staining parameter value.

According to embodiments, the selected optimal staining parameter values are used for staining a new test tissue sample as follows:

Selecting staining parameter values from the staining quality score plot and/or from the sensitivity plot having been computed for the extended tissue type "PT(+)"; staining the tissue sample in accordance with the selected staining parameters and check the staining quality; if a good staining quality is obtained, then terminate; else stain within other staining parameter values still lying within an optimal staining parameter value range computed for the extended tissue type PT(+); if a good quality staining is obtained, then terminate; else do a random walk in C (different stain concentration values) and RT (different staining duration values) towards the optimal staining parameter ranges having been identified for the extended tissue type MT(+), perform the staining on the tissue sample based on the staining parameter values selected in the random walk, evaluate the staining quality and repeat the random walk until a good staining quality is observed or until a maximum number of random walks, e.g. three, was performed. If still a bad staining quality of the tissue sample is observed, concluding that the tissue sample is of a tumor marker negative (e.g. Her2(s)) tissue type. The method can be terminated here, because the question whether a tissue sample is of type PT(−) or MT(−) does not have an impact e.g. on the question whether or not a patient shall be treated with a tumor-marker specific drug. If the tumor does not express the tumor marker, the drug will not be effective irrespective of whether the examined tissue is of type PT(−) or MT(−). Thus, according to preferred embodiments, the method as described above is performed for identifying, for an individual patient, the optimum staining parameter value ranges and combinations of parameter values that will result in high quality staining. The method can be used to accurately and reproducibly determine by means of IHC image analysis whether a tumor expresses a tumor marker and is a candidate for treatment by a marker-specific drug or not.

Embodiments of the invention may allow for conducting sensitivity analysis to staining parameters in digital pathology. Furthermore, embodiments of the invention may allow for automatically assessing the staining intensity and tissue sufficiency, to automatically identify the most likely tissue type and tumor-marker expression status and may allow to increase the reproducibility of the IHC staining over different staining laboratories. Preferably, the staining is performed using vMFP staining systems as a larger number of staining parameter value combinations can be tested with a given amount of stain/antibody or with a given amount of tissue. The features extracted can be used for assessing tissue heterogeneity. The automated identification of optimal staining parameter ranges allows reducing the laboratory work that was hitherto necessary for finding suitable staining parameter values and value combinations. Embodiments of the invention may enable the detection of false positive and false negative staining and wrong diagnoses and treatment decisions which may be the result of a bad staining. The staining quality scores are generated by machine-learning algorithms. Thus, a more robust quality metric and better modeling of staining quality with theoretical basis is provided. In some cases, the quality score prediction logic can be learned even without any supervision and labeling by the experts (i.e., doctors, pathologists). Further advantages are that no reference (standardized staining) tissue sample are required to calculate the staining quality as in prior work and that the method described herein can easily be modified to different tissue types, stains and/or staining devices and staining techniques.

FIG. 8 depicts a matrix of sample images of a tissue stained in accordance with two series of varying process parameter values. Tissue sample regions in the first row have all been stained with a stain/primary antibody concentration of 25 μg/mL staining solution. Tissue sample regions in the second row have all been stained with a stain/primary antibody concentration of 12.5 μg/mL staining solution. Tissue sample regions in the third row have all been stained with a stain/primary antibody concentration of 6.25 μg/mL staining solution. Tissue sample regions in the first column have all been stained for 12 seconds. Tissue sample regions in the second column have all been stained for 28 seconds. And so on. Preferably, all tissues depicted in the matrix are derived from the same patient and from the same tissue.

FIG. 9 depicts example images of five extended tissue types, whereby an extended tissue type is a tissue type having a particular tumor marker expression state. Image 902 depicts a Her2(+) primary tumor tissue. Image 904 depicts a Her2(+) metastasis tissue. Image 906 depicts a healthy tissue. Image 908 depicts a Her2(−) primary tumor tissue. Image 910 depicts a Her2(−) metastasis tissue.

FIG. 10 depicts image segments resulting from a segmentation process as described herein for embodiments of the invention. Image 920 depicts an RGB input image. Image 922 depicts a footprint region, i.e., a region supposed to have been stained e.g. by the head of a vMFP system that selectively stains small dots or stripes in a slide, in bright color. Image 924 depicts the primary background, i.e., a slide region that is supposed not to have been brought in contact with the staining solution, in bright color. Image 926 depicts the foreground, i.e., a high intensity image region supposed to indicate the location of an expressed and stained tumor marker, in bright color. Image 930 depicts the secondary background, i.e., a low intensity footprint region supposed to indicate a tissue region not expressing the tumor marker and having been brought into contact with the stain, in bright color.

FIG. 11 depicts patches, i.e., image sub-regions, used for local feature extraction on an image 940.

FIG. 12 depicts example outputs generated by a first classifier configured to identify, for each tissue patch, the extended tissue type to which the tissue depicted in the patch most likely belongs to. The patch-wise prediction of the most likely tissue type is illustrated in the right column comprising patches colorized in extended-tissue-type-specific colors, e.g. according to the following color code: blue: PT(−), red: PT(+), yellow: MT(−), green: MT(+) and black: H.

Preferably, the first classifier or the image analysis program is configured to evaluate the most likely extended tissue types assigned to each of the patches and to assign, in a majority vote operation, the extended tissue type receiving the highest number of votes of the patches to the whole tissue. Image 952 depicts an area of patches having assigned different extended tissue types and respective colors, whereby the majority of patches has blue color corresponding to the PT(−) type. Thus, the corresponding tissue image 950 is assigned in the majority vote the PT(−).

Image 956 depicts an area of patches having assigned different extended tissue types and respective colors, whereby the majority of patches has red color corresponding to the PT(+) type. Thus, the first classifier predicts the corresponding image 954 to depict a tissue of the PT(+) type.

Image 960 depicts multiple areas of patches having assigned different extended tissue types and respective colors, whereby the majority of patches has yellow color corresponding to the MT(−) type. Thus, the first classifier predicts the corresponding image 958 to depict a tissue of the MT(−) type.

Image 964 depicts multiple areas of patches having assigned different extended tissue types and respective colors, whereby the majority of patches has green color. Thus, the first classifier predicts the corresponding image 962 to depict a tissue of the MT(+) type.

FIG. 13 depicts a confusion matrix of predictions of extended tissue types. The labels in the leftmost column represent the "true" extended tissue types, the labels in the header row represent extended tissue types predicted by the first classifier. The main confusion occurs, as expected, between same Her2 expressions, i.e., MT(+) vs PT(+) and MT(−) vs PT(−).

FIG. 14 depicts example outputs of contrast level classification generated by the second classifier using patch-based color assignment. All images 980, 982, 984, 986 depict PT(+) samples. The top row images 980, 982 are examples of PT(+) tissues whose majority of patches is predicted by the second classifier to belong to the "HIGH CONTRAST LEVEL" class (and are colorized in a respective color, e.g. blue). The bottom row images 984, 986 are examples of PT(+) tissues whose majority of patches is predicted by the second classifier to belong to the "LOW CONTRAST LEVEL" class (and are colorized in a respective color, e.g. red). Based on a majority vote operation of all patches and their contrast level labels, the second classifier predicts the images 980, 982 to depict a tissue having "HIGH CONTRAST LEVEL" and predicts the images 984, 986 to depict a tissue having "LOW CONTRAST LEVEL".

FIG. 15 depicts 3D surface representations ("3D plots") representing Gaussian Polynomial fits on the data points of each extended tissue type: PT(−) (1502), PT(+) (1504), MT(−) (1506), MT(+) (1508). The higher the "peak"/the z-value, the higher the staining quality. Increasing staining quality can in addition be visualized by a color or brightness gradient ("3D heat map of staining quality").

Figure 16:
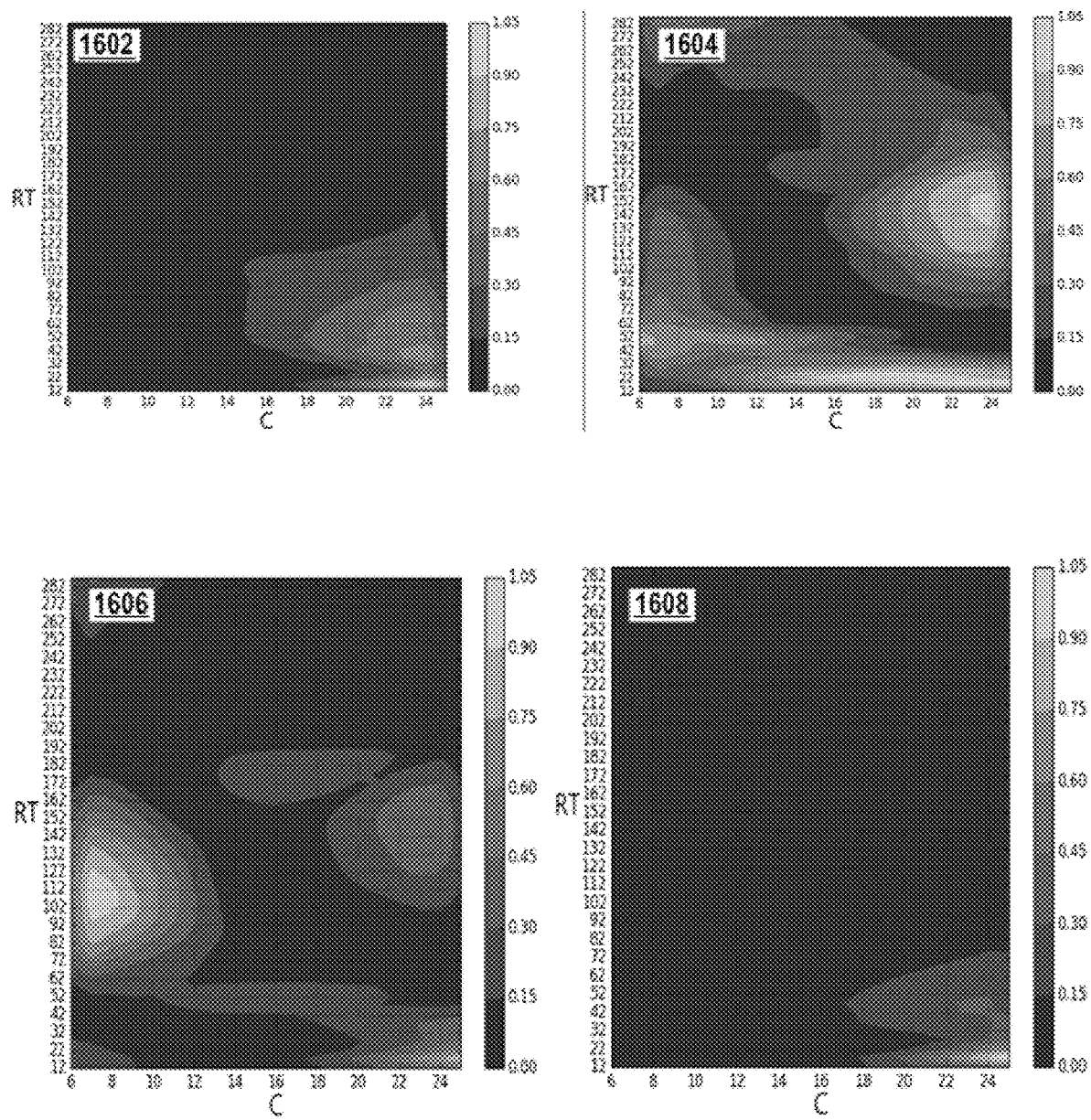
FIG. 16 depicts 2D contour plots ("heat maps") of extended tissue type specific sensitivity maps.

FIG. 16 depicts 2D contour plots ("heat maps") of extended tissue type specific staining sensitivity which are also referred to as "sensitivity maps" or "sensitivity plots". The sensitivity maps are based on a statistical analysis of the interdependence of tissue-image quality to the staining parameter values used for staining the tissue depicted in the respective image. The sensitivity maps may enable a user or an algorithm to select an optimal staining parameter value range for many staining parameters that allows for a staining procedure that is a good compromise of the aim to obtain high-quality immunostaining and to be robust against small changes in the staining parameter values. FIG. 16 shows sensitivity maps and thus the dependency of the staining quality score from the process parameter value combinations separately for each of the extended tissue types PT(−) (1602), PT(+) (1604), MT(−) (1606), MT(+) (1608).

The present invention may be a system, a method, and/or a computer program product.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Possible combinations of features described above can be the following:

Combination 1: An image analysis method for automatically determining the staining quality of an IHC stained biological sample, the method comprising:
  receiving a digital image of an IHC stained tissue sample of a patient, the pixel intensities of the image correlating with the amount of a tumor-marker-specific stain;
  extracting a plurality of features from the received digital image;
  inputting the extracted features into a first classifier, the first classifier being configured to identify the extended tissue type of the tissue depicted in the digital image as a function of at least some first ones of the extracted features, the extended tissue type being a tissue type with a defined expression level of the tumor marker;
  inputting the extracted features into a second classifier, the second classifier being configured to identify a contrast level of the tissue depicted in the digital image as a function of at least some second ones of the extracted features, the contrast level indicating the intensity contrast of pixels of the stained tissue;
  computing a staining quality score for the tissue depicted in the digital image as a function of the identified extended tissue type and the identified contrast level.

Combination 2: The image analysis method of any one of the previous combinations, the identification of the extended tissue type of the tissue depicted in each of the digital images comprising computing and outputting, for each of the extended tissue types and for each of a plurality of regions in the image, a probability being indicative of the probability that the tissue depicted in this region, if any, belongs to said extended tissue type;
  the identification of the contrast level of the tissue depicted in each of the digital images comprising computing and outputting, for each of a plurality of regions in the image, a probability that the tissue depicted in this region is a "HIGH CONTRAST" tissue and/or is a "LOW CONTRAST" tissue,
  the method further comprising:
  respectively representing the probabilities for extended tissue type membership and the probability for contrast level membership of the image regions as probability maps; the computing of the staining quality score comprising processing the probability maps.

Combination 3: The method of any one of the previous combinations, further comprising generating the first classifier by:
  receiving a plurality of training images of IHC stained tissue samples of one or more patients, the pixel intensities of each image correlating with the amount of a tumor-marker-specific stain, the tissue samples depicted in the training images comprising tissue samples derived from the same patient and the same tissue type stained with the same tumor-marker-specific stain but with different staining durations and different concentrations of the tumor-marker-specific stain, each tissue depicted in the training images being annotated with one of the extended tissue types;
  extracting a plurality of features from each of the received training images;
  training a first machine-learning program logic with at least some first ones of the extracted features and tissue type annotations of the training images for generating the first classifier as a trained version of the first machine-learning logic.

Combination 4: The method of any one of the previous combinations, further comprising generating the second classifier by:
  receiving a plurality of training images of IHC stained tissue samples of one or more patients, the pixel intensities of each image correlating with the amount of a tumor-marker-specific stain, the tissue samples depicted in the training images comprising tissue samples derived from the same patient and the same tissue type stained with the same tumor-marker-specific stain but with different staining durations and different concentrations of the tumor-marker-specific stain, each tissue depicted in the training images being annotated with one of a predefined set of contrast level labels comprising "HIGH CONTRAST" and "LOW CONTRAST";
  extracting a plurality of features from each of the received training images;
  training a second machine-learning program logic with at least some second ones of the extracted features, and the contrast level annotations of the training images for generating the second classifier as the trained version of the second machine learning logic.

Combination 5: The image analysis method of any one of the previous combinations, the computing of the staining quality score being performed by a prediction logic, the method further comprising generating the prediction logic, the generation comprising:
  receiving a plurality of training images of IHC stained tissue samples of one or more patients, the pixel intensities of each image correlating with the amount of a tumor-marker-specific stain, the depicted tissue samples having been stained with the same tumor-marker-specific stain but with different staining durations and different concentrations of the tumor-markerspecific stain, each tissue depicted in the training images being annotated with a staining quality score or a staining quality label;

applying the first and the second classifier on each of the training images for computing, for each of the training images, a plurality of probability maps, the probability maps indicating the probabilities of respective image regions for depicting a tissue that belongs to one of the extended tissue types and of depicting a tissue in a particular one of the contrast levels;

training a machine-learning logic on the probability maps of the training images such that an error between the annotated staining quality scores or labels and predicted quality scores or labels computed as a function of the probability maps is minimized.

Combination 6: The method of any one of the previous combinations 3-5, further comprising generating the training images, the generation comprising:

applying a plurality of IHC staining protocols differing from each other by at least one parameter value on a plurality of training tissue samples derived from the same patient, the plurality of IHC staining protocols being applied such that:

at least a first series of IHC staining protocols using different staining durations are applied;

at least a second series of IHC staining protocols using different concentrations of the tumor-marker-specific stain are applied; and for each of the staining durations of the first series at least two different stain concentration are applied and for each of the stain concentrations of the second series at least two different staining durations are applied.

Combination 7: The method of combination 6, the training tissue samples belonging to different tissue types comprising:

PT tissue, the PT tissue being tissue comprising or consisting of primary tumor tissue;

MT tissue, the MT tissue being tissue comprising or consisting of metastatic tumor tissue; and HT tissue, the HT tissue being healthy tissue located in spatial proximity of the primary tumor or of a metastasis.

Combination 8: the method of combination 6 or 7, the at least one parameter value being a staining duration value or a concentration of a tumor-marker-specific stain.

Combination 9: The method of any one of combinations 6-8, the application of the plurality of staining protocols comprising applying the plurality of staining protocols on different regions of the same tissue section by using a vertical microfluidic probe system Combination 10: The method of any one of the previous combinations, further comprising segmenting the received digital image, the segmentation comprising:

identifying the primary background of the image, the primary background depicting tissue regions not brought in contact with the stain;

identifying a footprint region in the image, the footprint region depicting a region in the image which was brought in contact with the stain, the footprint region being identified by subtracting the primary background from the received digital image;

selectively analyzing the footprint region for identifying the foreground region within the footprint region, the foreground region depicting stained tissue regions expressing the tumor-marker;

selectively analyzing the footprint region for identifying the secondary background within the footprint region, the secondary background depicting tissue regions not supposed to express the tumor-marker.

Combination 11: The method of combination 10, the identification of the primary background comprising:

receiving the digital image as an RGB image, the stained tissue regions corresponding to low-intensity image regions and unstained tissue regions corresponding to high intensity image regions;

converting the RGB image into a grayscale image;

inverting the grayscale image such that stained tissue regions correspond to high-intensity image regions and unstained tissue regions correspond to low-intensity image regions;

extracting a footprint mask by applying a non-parametric marker-based Watershed algorithm on the inverted grayscale image; and extracting the footprint region in the received digital image as the region of the digital image not masked by the footprint mask.

Combination 12: The method of combination 10 or 11, the identification of the foreground region comprising:

calculating a histogram of the pixel intensities of the footprint region;

identifying a highest-frequency-bin in the histogram, the highest-frequency-bin being the one of the histogram bins comprising the highest number of intensities observed in the image;

identifying a highest-intensity bin in the histogram, the highest-intensity-bin being the one of the histogram bins that comprises the highest intensities observed in the image and which in addition comprises more than a predefined threshold of the total pixels in the histogram;

identifying a first maximum intensity, the first maximum intensity being the maximum intensity of the highest-frequency-bin;

identifying a second maximum intensity, the second maximum intensity being the maximum intensity of the highest-intensity-bin;

computing the mean of the first and the second maximum intensities generating a foreground mask by using the computed mean as threshold value, the foreground mask hiding all pixels in the footprint region whose intensity values is below said threshold value;

identifying the foreground region by applying the foreground mask on the footprint region of the received digital image, whereby only the pixels of the footprint region which are not hidden by the foreground masks are used as foreground pixels.

Combination 13: The method of any one of the previous combinations, the extraction of the features from the received digital image comprising extracting global features derived from all pixels in the image and extracting local features from patches within the images.

Combination 14: The method of combination 13, the extraction of the global features comprising:

performing the segmentation according to any one of combinations 10-12; and computing one or more segmentation statistics features from the image segments, the segmentation statistics features being selected from a group comprising:

percentage of foreground pixels within the whole received image, percentage of foreground pixels within the footprint regions, percentage of footprint region pixels within the whole image;

and/or:
computing one or more intensity features from the image segments, the intensity features being selected from a group comprising:
Mean intensity of foreground pixels;
Mean intensity of footprint region pixels;
Mean intensity of secondary background pixels;
ratio of mean pixel intensity in the foreground region and mean pixel intensity in the secondary background, the ratio representing a signal-to-noise ratio;
and/or:
computing one or more Scale-Invariant Feature Transform (SIFT) features by applying difference of Gaussian filters with different values selectively on the foreground region of the image to obtain multiple keypoints; and extracting Scale-Invariant Feature Transform (SIFT) features in spatial proximity to the keypoints.

Combination 16: The method of any one of the previous combinations, further comprising:
performing the segmentation according to any one of combinations 10-12;
computing the ratio of mean pixel intensity in the foreground region and mean pixel intensity in the secondary background; and
using the computed ratio at least as one of the second features provided to the second classifier for computing the contrast level.

Combination 17: The method of any one of the combinations 13-16, further comprising combining the global features, e.g. SIFT features, and local features such that a feature vector of predefined length is generated for the image, the length of the feature vector being identical for all images from which the features are extracted.

Combination 18: The method of any one of the previous combinations 13-17, the extraction of local features from an image comprising:
dividing the image into overlapping patches of pixels;
moving a window of patch-size across the image, the moving comprising, upon the sliding window covering a new current patch:
determining if the pixels in the current patch meet a predefined criterion;
selectively in case the criterion is fulfilled, processing the pixels of the current patch for extracting a local feature from the current patch.

Combination 19: The method of any one of combinations 13-18, the method comprising:
performing the segmentation according to any one of combinations 10-12, the extraction of the local features comprising, for each of the patches fulfilling the criterion, computing a spatial feature selected from a group comprising:
a Gabor wavelet transform feature;
a dual-tree complex wavelet transform (DTCWT) feature;
a discrete wavelet transform (DWT) feature;
a texture feature.

Combination 20: The method of any one of the previous combinations, the tumor being breast cancer and the tumor-marker being Her2 and the tumor-marker-specific stain being a primary antibody adapted to selectively bind to Her2 and adapted to be coupled directly or indirectly to the, stain during the staining process.

Combination 21: An image analysis method for automatically determining, for one or more staining protocol parameters of an IHC staining protocol, a respective parameter value range that will result in a staining of a tissue sample with a tumor-marker specific stain that fulfills predefined staining quality requirements, the method comprising:
receiving a plurality of images of one or more IHC stained tissue samples belonging to multiple different extended tissue types, the pixel intensities of each image correlating with the amount of a tumor-marker-specific stain, the depicted tissue samples having been stained with the same tumor-marker-specific stain but with different values of each of the one or more staining protocol parameters;
extracting a plurality of features from each of the received digital images;
automatically analyzing the extracted features for identifying an extended tissue type and a contrast level of each of the tissue samples, the extended tissue type being a tissue type with a defined expression level of the tumor marker;
for the tissue depicted in each of the received images, computing a staining quality score as a function of the identified extended tissue type and the identified contrast level of the tissue;
performing, for each of the one or more staining protocol parameters:
for each of the extended tissue types:
identifying all images depicting a tissue of said extended tissue type for which a quality score that exceeds a quality threshold was computed;
identifying the minimum and maximum staining parameter value used in the staining protocols that were applied for staining the tissues depicted in said identified images;
returning a staining parameter value range for the staining protocol parameter, the range being delimited by the identified minimum and maximum values.

Combination 21: The method of combination 21, the staining quality score being computed by applying the method of any one of combinations 1-20.

Combination 22: The method of combination 21 or 22, further comprising:
generating, for each of the extended tissue types depicted in the received digital images, a respective multi-dimensional staining quality plot, at least two plot dimensions respectively representing one of the staining protocol parameters used for staining the tissues depicted in the received images, the staining quality scores computed for each staining protocol value being graphically represented in the form of a grey-level scale or color scale or in the form of a further dimension of the staining quality plot; and
presenting the staining quality plot on a display screen for enabling a user to manually select, selectively for the extended tissue type for which the plot was generated and for each of the staining protocol parameters, a parameter value range that corresponds to high quality tissue staining.

Combination 23: The method of combination 21 or 22, further comprising:
generating, for each of the extended tissue types depicted in the received digital images, a respective multi-dimensional sensitivity plot, at least two plot dimensions of the sensitivity plot respectively representing one of the staining protocol parameters used for staining the tissues depicted in the received images, the degree of sensitivity of the staining quality from a staining protocol parameter combination being graphically represented in the form of a grey-level scale or color scale or in the form of a further dimension of the sensitivity plot; and presenting the sensitivity plot on a display screen for enabling a user to manually select, selectively for the extended tissue type for which the sensitivity plot was generated and for each of the staining protocol parameters, a parameter value range that is free of parameter values for which a sensitivity maximum is indicated by the sensitivity plot.

Combination 24: The method or system of any one of the previous combinations, the extended tissue type being selected from a group comprising:

PT+ tissue, the PT+ tissue being tissue comprising or consisting of primary tumor tissue that expresses the tumor-marker;

PT− tissue, the PT− tissue being tissue comprising or consisting of primary tumor tissue that does not expresses the tumor-marker;

MT+ tissue, the MT+ tissue being tissue comprising or consisting of metastatic tumor tissue that expresses the tumor-marker;

MT− tissue, the MT− tissue being tissue comprising or consisting of metastatic tumor tissue that does not expresses the tumor-marker;

HT tissue, the HT tissue being healthy tissue located in spatial proximity of the primary tumor or of a metastasis.

Combination 25: A computer readable storage medium comprising computer-interpretable instructions which, when executed by a processor, cause the processor to perform a method according to any one of the previous combinations.

The invention claimed is:

1. An image analysis method for automatically determining the staining quality of an IHC stained biological sample, the method comprising:

receiving a digital image of an IHC stained tissue sample of a patient, the pixel intensities of the image correlating with the amount of a tumor-marker-specific stain;

extracting a plurality of features from the received digital image, wherein the extracted plurality of features comprises at least information relating to the pixel intensities of the digital image;

inputting the extracted features into a first classifier, the first classifier being configured to identify an extended tissue type of the tissue depicted in the digital image as a function of at least some first ones of the extracted features, wherein the extended tissue type comprises a defined expression level of a presence of the tumor marker and the identification of the extended tissue type includes an identification of the defined expression level;

inputting the extracted features into a second classifier, the second classifier being configured to identify a contrast level of the tissue depicted in the digital image as a function of at least some second ones of the extracted features, the contrast level indicating the intensity contrast of pixels of the stained tissue;

computing a staining quality score for the tissue depicted in the digital image as a function of the identified extended tissue type from the first classifier and the identified contrast level from the second classifier.

2. The image analysis method of claim 1, the identification of the extended tissue type of the tissue depicted in each of the digital images comprising computing and outputting, for each of the extended tissue types and for each of a plurality of regions in the image, a probability being indicative of the probability that the tissue depicted in this region, if any, belongs to said extended tissue type;

the identification of the contrast level of the tissue depicted in each of the digital images comprising computing and outputting, for each of a plurality of regions in the image, a probability that the tissue depicted in this region is a "HIGH CONTRAST" tissue and/or is a "LOW CONTRAST" tissue, the method further comprising:

respectively representing the probabilities for extended tissue type membership and the probability for contrast level membership of the image regions as probability maps;

the computing of the staining quality score comprising processing the probability maps.

3. The method of claim 1, further comprising generating the first classifier by:

receiving a plurality of training images of IHC stained tissue samples of one or more patients, the pixel intensities of each image correlating with the amount of a tumor-marker-specific stain, the tissue samples depicted in the training images comprising tissue samples derived from the same patient and the same tissue type stained with the same tumor-marker-specific stain but with different staining durations and different concentrations of the tumor-marker-specific stain, each tissue depicted in the training images being annotated with one of the extended tissue types;

extracting a plurality of features from each of the received training images;

training a first machine-learning program logic with at least some first ones of the extracted features and tissue type annotations of the training images for generating the first classifier as a trained version of the first machine-learning logic.

4. The method of claim 1, further comprising generating the second classifier by:

receiving a plurality of training images of IHC stained tissue samples of one or more patients, the pixel intensities of each image correlating with the amount of a tumor-marker-specific stain, the tissue samples depicted in the training images comprising tissue samples derived from the same patient and the same tissue type stained with the same tumor-marker-specific stain but with different staining durations and different concentrations of the tumor-marker-specific stain, each tissue depicted in the training images being annotated with one of a predefined set of contrast level labels comprising "HIGH CONTRAST" and "LOW CONTRAST";

extracting a plurality of features from each of the received training images;

training a second machine-learning program logic with at least some second ones of the extracted features, and the contrast level annotations of the training images for generating the second classifier as the trained version of the second machine learning logic.

5. The method of claim 1, the computing of the staining quality score being performed by a prediction logic, the method further comprising generating the prediction logic, the generation comprising:

receiving a plurality of training images of IHC stained tissue samples of one or more patients, the pixel intensities of each image correlating with the amount of a tumor-marker-specific stain, the depicted tissue samples having been stained with the same tumormarker-specific stain but with different staining durations and different concentrations of the tumor-marker-specific stain, each tissue depicted in the training images being annotated with a staining quality score or a staining quality label;

applying the first and the second classifier on each of the training images for computing, for each of the training images, a plurality of probability maps, the probability maps indicating the probabilities of respective image regions for depicting a tissue that belongs to one of the extended tissue types and of depicting a tissue in a particular one of the contrast levels;

training a machine-learning logic on the probability maps of the training images such that an error between the annotated staining quality scores or labels and predicted quality scores or labels computed as a function of the probability maps is minimized.

6. The method of claim 3, further comprising generating the training images, the generation comprising:

applying a plurality of IHC staining protocols differing from each other by at least one parameter value on a plurality of training tissue samples derived from the same patient, the plurality of IHC staining protocols being applied such that:

at least a first series of IHC staining protocols using different staining durations are applied;

at least a second series of IHC staining protocols using different concentrations of the tumor-marker-specific stain are applied; and for each of the staining durations of the first series at least two different stain concentrations are applied and for each of the stain concentrations of the second series at least two different staining durations are applied.

7. The method of claim 6, the training tissue samples belonging to different tissue types comprising:

PT tissue, the PT tissue being tissue comprising or consisting of primary tumor tissue;

MT tissue, the MT tissue being tissue comprising or consisting of metastatic tumor tissue; and HT tissue, the HT tissue being healthy tissue located in spatial proximity of the primary tumor or of a metastasis.

8. The method of claim 6, the at least one parameter value being a staining duration value or a concentration of a tumor-marker-specific stain.

9. The method of claim 6, the application of the plurality of staining protocols comprising applying the plurality of staining protocols on different regions of the same tissue section by using a vertical microfluidic probe system.

10. The method of claim 1, further comprising segmenting the received digital image, the segmentation comprising:

identifying the primary background of the image, the primary background depicting tissue regions not brought in contact with the stain;

identifying a footprint region in the image, the footprint region depicting a region in the image which was brought in contact with the stain, the footprint region being identified by subtracting the primary background from the received digital image;

selectively analyzing the footprint region for identifying the foreground region within the footprint region, the foreground region depicting stained tissue regions expressing the tumor-marker;

selectively analyzing the footprint region for identifying the secondary background within the footprint region, the secondary background depicting tissue regions not supposed to express the tumor-marker.

11. The method of claim 10, the identification of the primary background comprising:

receiving the digital image as an RGB image, the stained tissue regions corresponding to low-intensity image regions and unstained tissue regions corresponding to high intensity image regions;

converting the RGB image into a grayscale image;

inverting the grayscale image such that stained tissue regions correspond to high-intensity image regions and unstained tissue regions correspond to low-intensity image regions;

extracting a footprint mask by applying a non-parametric marker-based Watershed algorithm on the inverted grayscale image; and extracting the footprint region in the received digital image as the region of the digital image not masked by the footprint mask.

12. The method of claim 10, the identification of the foreground region comprising:

calculating a histogram of the pixel intensities of the footprint region;

identifying a highest-frequency-bin in the histogram, the highest-frequency-bin being the one of the histogram bins comprising the highest number of intensities observed in the image;

identifying a highest-intensity bin in the histogram, the highest-intensity-bin being the one of the histogram bins that comprises the highest intensities observed in the image and which in addition comprises more than a predefined threshold of the total pixels in the histogram;

identifying a first maximum intensity, the first maximum intensity being the maximum intensity of the highest-frequency-bin;

identifying a second maximum intensity, the second maximum intensity being the maximum intensity of the highest-intensity-bin;

computing the mean of the first and the second maximum intensities;

generating a foreground mask by using the computed mean as threshold value, the foreground mask hiding all pixels in the footprint region whose intensity values is below said threshold value;

identifying the foreground region by applying the foreground mask on the footprint region of the received digital image, whereby only the pixels of the footprint region which are not hidden by the foreground masks are used as foreground pixels.

13. The method of claim 1, the extraction of the features from the received digital image comprising extracting global features derived from all pixels in the image and extracting local features from patches within the images.

14. The method of claim 13, the extraction of the global features comprising:

segmenting the received digital image, the segmentation comprising:

identifying the primary background of the image, the primary background depicting tissue regions not brought in contact with the stain;

identifying a footprint region in the image, the footprint region depicting a region in the image which was brought in contact with the stain, the footprint region being identified by subtracting the primary background from the received digital image;

selectively analyzing the footprint region for identifying the foreground region within the footprint region, the foreground region depicting stained tissue regions expressing the tumor-marker;

selectively analyzing the footprint region for identifying the secondary background within the footprint region, the secondary background depicting tissue regions not supposed to express the tumor-marker; and computing one or more segmentation statistics features from the image segments, the segmentation statistics features being selected from a group comprising:
percentage of foreground pixels within the whole received image,
percentage of foreground pixels within the footprint regions,
percentage of footprint region pixels within the whole image;

and/or:

computing one or more intensity features from the image segments, the intensity features being selected from a group comprising:
Mean intensity of foreground pixels;
Mean intensity of footprint region pixels;
Mean intensity of secondary background pixels;
ratio of mean pixel intensity in the foreground region and mean pixel intensity in the secondary background, the ratio representing a signal-to-noise ratio and/or:

computing one or more Scale-Invariant Feature Transform (SIFT) features by applying difference of Gaussian filters with different values selectively on the foreground region of the image to obtain multiple keypoints; and extracting Scale-Invariant Feature Transform (SIFT) features in spatial proximity to the keypoints.

15. The method of claim 13, the extraction of local features from an image comprising:
dividing the image into overlapping patches of pixels;
moving a window of patch-size across the image, the moving comprising, upon the sliding window covering a new current patch:
determining if the pixels in the current patch meet a predefined criterion;
selectively in case the criterion is fulfilled, processing the pixels of the current patch for extracting a local feature from the current patch.

16. The method of claim 13, the extraction of local features from an image comprising:
segmenting the received digital image, the segmentation comprising:
identifying the primary background of the image, the primary background depicting tissue regions not brought in contact with the stain;
identifying a footprint region in the image, the footprint region depicting a region in the image which was brought in contact with the stain, the footprint region being identified by subtracting the primary background from the received digital image;
selectively analyzing the footprint region for identifying the foreground region within the footprint region, the foreground region depicting stained tissue regions expressing the tumor-marker;
selectively analyzing the footprint region for identifying the secondary background within the footprint region, the secondary background depicting tissue regions not supposed to express the tumor-marker, wherein the extraction of the local features comprising, for each of the patches fulfilling the criterion, computing a spatial feature selected from a group comprising:
a Gabor wavelet transform feature;
a dual-tree complex wavelet transform (DTCWT) feature;
a discrete wavelet transform (DWT) feature;
a texture feature.

17. The method of claim 13, further comprising combining the global features and local features such that a feature vector of predefined length is generated for the image, the length of the feature vector being identical for all images from which the features are extracted.

18. An image analysis method for automatically determining, for one or more staining protocol parameters of an IHC staining protocol, a respective parameter value range that will result in a staining of a tissue sample with a tumor-marker specific stain that fulfills predefined staining quality requirements, the method comprising:
receiving a plurality of images of one or more IHC stained tissue samples belonging to multiple different extended tissue types, the pixel intensities of each image correlating with the amount of a tumor-marker-specific stain, the depicted tissue samples having been stained with the same tumor-marker-specific stain but with different values of each of the one or more staining protocol parameters;
extracting a plurality of features from each of the received digital images, wherein the extracted plurality of features comprises at least information relating to the pixel intensities of the digital image;
automatically analyzing the extracted features for identifying an extended tissue type using a first classifier and a contrast level of each of the tissue samples using a second classifier, wherein the extended tissue type comprises a defined expression level of a presence of the tumor marker and the identification of the extended tissue type includes an identification of the defined expression level by at least:
inputting the extracted features of the respective received image into the first classifier, the first classifier being configured to identify the extended tissue type of the tissue depicted in the digital image as a function of at least some first ones of the extracted features of the respective received image; and
inputting the extracted features of the respective received image into the second classifier, the second classifier being configured to identify the contrast level of the tissue depicted in the digital image as a function of at least some second ones of the extracted features of the respective received image, the contrast level indicating the intensity contrast of pixels of the stained tissue;
for the tissue depicted in each of the received images, computing a staining quality score as a function of the identified extended tissue type from the first classifier and the identified contrast level of the tissue from the second classifier;
performing, for each of the one or more staining protocol parameters:
for each of the extended tissue types:
identifying all images depicting a tissue of said extended tissue type for which a quality score that exceeds or meets an acceptable quality threshold was computed;

identifying the minimum and maximum staining parameter value used in the staining protocols that were applied for staining the tissues depicted in said identified images;
returning a staining parameter value range for the staining protocol parameter, the range being delimited by the identified minimum and maximum values.

19. The method of claim 18, further comprising:
generating, for each of the extended tissue types depicted in the received digital images, a respective multi-dimensional staining quality plot, at least two plot dimensions respectively representing one of the staining protocol parameters used for staining the tissues depicted in the received images, the staining quality scores computed for each staining protocol value being graphically represented in the form of a grey-level scale or color scale or in the form of a further dimension of the staining quality plot; and
presenting the staining quality plot on a display screen for enabling a user to manually select, selectively for the extended tissue type for which the plot was generated and for each of the staining protocol parameters, a parameter value range that corresponds to high quality tissue staining.

20. The method of claim 18, further comprising:
generating, for each of the extended tissue types depicted in the received digital images, a respective multi-dimensional sensitivity plot, at least two plot dimensions of the sensitivity plot respectively representing one of the staining protocol parameters used for staining the tissues depicted in the received images, the degree of sensitivity of the staining quality from a staining protocol parameter combination being graphically represented in the form of a grey-level scale or color scale or in the form of a further dimension of the sensitivity plot; and
presenting the sensitivity plot on a display screen for enabling a user to manually select, selectively for the extended tissue type for which the sensitivity plot was generated and for each of the staining protocol parameters, a parameter value range that is free of parameter values for which a sensitivity maximum is indicated by the sensitivity plot.

21. The method of claim 1, the extended tissue type being selected from a group comprising:
PT+ tissue, the PT+ tissue being tissue comprising or consisting of primary tumor tissue that expresses the tumor-marker;
PT− tissue, the PT− tissue being tissue comprising or consisting of primary tumor tissue that does not express the tumor-marker;
MT+ tissue, the MT+ tissue being tissue comprising or consisting of metastatic tumor tissue that expresses the tumor-marker;
MT− tissue, the MT− tissue being tissue comprising or consisting of metastatic tumor tissue that does not express the tumor-marker;
HT tissue, the HT tissue being healthy tissue located in spatial proximity of the primary tumor or of a metastasis.

22. A computer readable storage medium comprising computer-interpretable instructions which, when executed by a processor, cause the processor to perform a method according to claim 1.

23. An image analysis system comprising:
a storage medium comprising a first classifier and a second classifier;
an interface configured for receiving a digital image of an IHC stained tissue, the pixel intensities of the image correlating with the amount of a tumor-marker-specific stain;
a processor configured for:
extracting a plurality of features from the received digital image, wherein the extracted plurality of features comprises at least information relating to the pixel intensities of the digital image;
inputting the extracted features into the first classifier, the first classifier being configured to identify an extended tissue type of the tissue depicted in the digital image as a function of at least some first ones of the extracted features, wherein the extended tissue type comprises a defined expression level of a presence of the tumor marker and the identification of the extended tissue type includes an identification of the defined expression level;
inputting the extracted features into the second classifier, the second classifier being configured to identify a contrast level of the tissue depicted in the digital image as a function of at least some second ones of the extracted features, the contrast level label indicating the intensity contrast of pixels of the stained tissue;
computing a staining quality score for the tissue depicted in the digital image as a function of the identified extended tissue type from the first classifier and the identified contrast level from the second classifier.

24. An image analysis system comprising:
a storage medium comprising a first classifier and a second classifier;
an interface configured for receiving a plurality of images of one or more IHC stained tissue samples belonging to multiple different extended tissue types, the pixel intensities of each image correlating with the amount of a tumor-marker-specific stain, the depicted tissue samples having been stained with the same tumor-marker-specific stain but with different values of each of the one or more staining protocol parameters;
a processor configured for:
extracting a plurality of features from each of the received digital images, wherein the extracted plurality of features comprises at least information relating to the pixel intensities of the digital image;
automatically analyzing the extracted features for identifying an extended tissue type using the first classifier and a contrast level of each of the tissue samples using the second classifier, wherein the extended tissue type comprises a defined expression level of a presence of the tumor marker and the identification of the extended tissue type includes an identification of the defined expression level by at least:
inputting the extracted features of the respective received image into the first classifier, the first classifier being configured to identify the extended tissue type of the tissue depicted in the digital image as a function of at least some first ones of the extracted features of the respective received image; and
inputting the extracted features of the respective received image into the second classifier, the second classifier being configured to identify the contrast level of the tissue depicted in the digital image as a function of at least some second ones of the extracted features of the respective received image, the contrast level indicating the intensity contrast of pixels of the stained tissue;

for the tissue depicted in each of the received images, computing a staining quality score as a function of the identified extended tissue type from the first classifier and the identified contrast level of the tissue from the second classifier;

performing, for each of the one or more staining protocol parameters:

for each of the extended tissue types:

identifying all images depicting a tissue of said extended tissue type for which a quality score that exceeds or meets an acceptable quality threshold was computed;

identifying the minimum and maximum staining parameter value used in the staining protocols that were applied for staining the tissues depicted in said identified images;

returning a staining parameter value range for the staining protocol parameter, the range being delimited by the identified minimum and maximum values, the range being a staining parameter range adapted to stain a biological sample with a tumor-marker specific stain such that predefined staining quality requirements are fulfilled.

\* \* \* \* \*